United States Patent [19]
Hsu et al.

[11] Patent Number: 6,137,812
[45] Date of Patent: Oct. 24, 2000

[54] MULTIPLE CAVITY FIBER FABRY-PEROT LASERS

[75] Inventors: Kevin Hsu, Roswell, Ga.; Calvin M. Miller, Naples, Fla.; David N. Payne; Jon-Thomas Kringlebotn, both of Southampton, United Kingdom

[73] Assignees: Micron Optics, Inc., Atlanta, Ga.; University of Southampton, Southampton, United Kingdom

[21] Appl. No.: 08/805,461

[22] Filed: Feb. 25, 1997

Related U.S. Application Data

[63] Continuation of application No. 08/461,376, Jun. 5, 1995, abandoned, which is a continuation-in-part of application No. 08/201,197, Feb. 24, 1994, Pat. No. 5,425,039.

[51] Int. Cl.[7] .................................................... H01S 3/30
[52] U.S. Cl. ............................................................... 372/6
[58] Field of Search ..................................................... 372/6

[56] References Cited

U.S. PATENT DOCUMENTS

| | | | |
|---|---|---|---|
| 4,358,851 | 11/1982 | Seifres et al. | 372/97 |
| 4,545,644 | 10/1985 | DeVeau et al. | 385/64 |
| 4,680,767 | 7/1987 | Hakimi et al. | 372/6 |
| 4,780,877 | 10/1988 | Snitzer | 372/6 |
| 4,782,491 | 11/1988 | Snitzer | 372/6 |
| 4,955,025 | 9/1990 | Mears et al. | 372/6 |
| 5,050,949 | 9/1991 | DiGiovanni et al. | 372/6 |
| 5,062,684 | 11/1991 | Clayton et al. | 385/27 |
| 5,073,004 | 12/1991 | Clayton et al. | 385/27 |
| 5,208,886 | 5/1993 | Clayton et al. | 385/73 |
| 5,212,745 | 5/1993 | Miller | 385/25 |
| 5,212,746 | 5/1993 | Miller et al. | 385/25 |
| 5,289,552 | 2/1994 | Miller et al. | 385/73 |
| 5,375,181 | 12/1994 | Miller | 385/27 |
| 5,422,970 | 6/1995 | Miller | 385/72 |
| 5,425,039 | 6/1995 | Hsu et al. | 372/6 |
| 5,650,856 | 7/1997 | Morse | 372/6 |

FOREIGN PATENT DOCUMENTS

| | | |
|---|---|---|
| 0457484A2 | 11/1991 | European Pat. Off. |
| 0533324A2 | 3/1993 | European Pat. Off. |

OTHER PUBLICATIONS

Kringlebotn, J.T. et al. (1993) "Efficient Single Frequency Erbium:Ytterbium Fibre Laser," 19th European Conf. on Optical Communication 2:65–68 No month.

Laporta, P. et al. (1993), "Diode–pumped Microchip Er–Yb:glass Laser," Opt. Lett. 18:1232–1234 No month.

(List continued on next page.)

*Primary Examiner*—James W. Davie
*Assistant Examiner*—Robert E. Wise
*Attorney, Agent, or Firm*—Greenlee, Winner & Sullivan, P.C.

[57] ABSTRACT

Multiple-cavity fiber optic lasers are fabricated with high-gain fibers in low-loss, high-finesse fiber ferrule resonance cavity configurations supported in low-loss ferrule alignment fixtures developed for use in FFP filters. These lasers incorporate rare-earth doped, sensitized glass fiber as the active medium within FFP cavities. FFP lasers of this invention include those exhibiting single-frequency and/or single-polarization mode operation with wide mode separation. Lasers provided include those with short cavity lengths, where the longest of the cavities of can be less than or equal to about 10 mm in length. These FFP laser sources are fixed-frequency or discretely-tunable. Multiple-cavity configurations in which at least one of the cavities formed contains active fiber are readily formed in fiber ferrule assemblies. FFP lasers can be end-pumped using single- or double-pass pumping configuration or pump resonance cavity configurations. Compound cavity FFP lasers of this invention can be readily and conveniently combined with fiber amplifiers to increase fiber laser output power. Ferrule assemblies and alignment fixtures afford simple, high-precision fiber alignment which is stable as a function of cavity tuning and over reasonable device operating temperatures.

28 Claims, 14 Drawing Sheets

OTHER PUBLICATIONS

Poulsen, C.V. and Sejka, M. (1993), "Highly Optimized Tunable $Er^{3+}$—Doped Single Longitudinal Mode Fiber Ring Laser, Experiment and Model," IEEE Photonics Tech. Lett. 5:646–648 No month.

Ball, G.A. et al. (1993), "Polarimetric Heterodyning Bragg–grating Fiber–laser Sensor," Opt. Lett. 18(22):1976–1978 No month.

Ball, G.A. et al. (1993), "Low Noise Single Frequency Linear Fibre Laser," Electron. Lett. 29(18):1623–1625 No month.

Ball, G.A. et al. (1993), "Modeling of Short, Single–frequency, Fiber Lasers in High–gain Fiber," IEEE Photonics Tech. Letts. 5(6):649–651 No month.

Ball, G.A. and Glen, W.H. (1992), "Design of a Single–mode Linear–cavity Erbium Fiber Laser Utilizing Bragg Reflectors," J. Lightwave Technol. 10(10):1338–43 No month.

Ball, G.A. and Morey, W.W. (1992), "Narrow–linewidth fiber laser with integrated Master Oscillator–power amplifier," Conf. on Optical Fiber Commun. (OFC'92) session WA3, p. 97 No month.

Zyskind et al. (1992), "Short Single Frequency Erbium–Doped Fibre Laser," Electron. Lett. 28(15):1385–1387 No month.

Ball, G.A. and Morey, W.W. (1992), "Continuously tunable single–mode erbium fiber laser," Opt. Lett. 17(6):420–421.

Grasso, G. et al. (1991), "Single Longitudinal Mode Operation of an Erbium–Doped Fiber Laser with Microoptics Fabry–Perot Interferometer," 17th European Conf. on Optical Communication 1:149–152 No month.

Townsend, J.E. et al. (1991) "$Yb^{2+}$Sensitised $Er^{3+}$Doped Silica Optical Fibre with Ultrahigh Transfer Efficiency and Gain," Electron. Lett. 27(21):1958–1959.

Townsend, J.E. et al. (1992) "$Yb^{2+}$ Sensitised $Er^{3+}$ Doped Silica Optical Fibre with Ultrahigh Transfer Efficiency and Gain," Mater. Res. Soc. Symp. Proc. 244:143–147 (Materials Research Society) No month.

Reekie, L. et al. (1986), "Tunable Single–Mode Fiber Lasers," J. Lightwave Technol. LT–4(7):956 No month.

Siegman, A.E. (1986), *Lasers*, University Science Books, Mill Valley, California, Ch. 13: "Oscillation Dynamics and Oscillation Threshold," pp. 524–531 No month.

Agrawal, G.P. and Dutta, N.K. (1986), *Long Wavelength Semiconductor Lasers*, Van Nostrand Rheinhold Comp., New York, Ch. 8: "Coupled–Cavity Semiconductor Lasers," pp. 333–371 No month.

Hunter, M.A. (1961), Metals Handbook, American Society of Metals 8th Ed. (Taylor Lymna, ed.) vol. 1, p. 816–819 No month.

Miller, C.M. and Janniello, F.J. (1990), "Passively Temperature–compensated Fibre Fabry–Perot Filter and its Application in Wavelength Division Multiple Access Computer Network," Electron. Lett. 26:2122–2123 No month.

Kaminow, I.P. (1987), "FDM–FBK Star Network with a Tunable Optical Filter Demultiplexer," Electron. Lett. 23:1102–1103 No month.

Fishman et al. (1990), "A High Capacity Noncoherent FSK Lightwave Field Experiment using $Er^{3+}$ —Doped Fiber Optical Amplifiers," IEEE Photo. Tech. Lett. 2:(9):662–664 No month.

Hsu et al. (1995), "Continuous and discrete wavelength tuning in Er:Yb fiber Fabry–Perot lasers," Opt. Lett. 20(4):377–379 No month.

Hsu et al. (1994), "Single–mode tunable erbium:ytterbium fiber Fabry–Perot microlaser," Opt. Lett. 19(12):886–88 No month.

Hsu, K. et al. (1994), "Tunable, Single–Frequency Er:Yb Phospho–Silicate Fiber Fabry–Perot Lasers," ECOC '94. 20th European Conf. on Optical Communication, Part vol. 1, pp. 361–364 No month.

MULTIPLE CAVITY FIBER FABRY-PEROT LASERS

REFERENCE TO RELATED APPLICATIONS

This application is a continuation of U.S. application Ser. No. 08/461,376, filed Jun. 5, 1995 and now abandoned, which is a continuation-in-part of U.S. application Ser. No. 08/201,197, filed Feb. 24, 1994, now U.S. Pat. No. 5,425,039, both of which are incorporated by reference in their entirety herein.

FIELD OF THE INVENTION

This invention relates to fiber optic lasers in general and more specifically to tunable and fixed wavelength single-frequency lasers useful in optical communications systems.

BACKGROUND OF THE INVENTION

Erbium fiber lasers emitting in the 1.55 $\mu$m wavelength region have been under intensive research for applications in telecommunications, spectroscopy and fiber sensors. To achieve single-frequency operation, fiber lasers constructed with either Fabry-Perot (FP) cavities or ring cavities have wavelength filtering components such as external gratings (L. Reekie, R. J. Mears, S. B. Poole, and D. N. Payne (1986) J. Lightwave Tech., LT-4, p.956), in-fiber gratings (J. T. Kringlebotn, P. R. Morkel, L. Reekie, J. L. Archambault, and D. N. Payne (1993) 19th European Conference on Optical Communication, 2:65; G. A. Ball and W. H. Glen (1992) J. Lightwave Tech. 10(10): 1338–43; G. A. Ball and W. W. Morey (1992) Conference on Optical Fiber Communications (OFC'92) session WA3, p.97), and Fabry-Perot filters (FFPs) (G. Grasso, A. Righetti, and F. Fontana (1991) 17th European Conference on Optical Communication, 1:149. and C. V. Poulsen and M. Sekja (1993) IEEE Photonics Tech. Lett. 5:646). Wavelength is tuned by filter adjustments. Recently, (P. Laporta, S. Taccheo, S. Longhi, and O. Svelto (1993) Optics Lett. 18:1232 reported single longitudinal mode operation of a microchip erbium:ytterbium (Er:Yb) phosphate glass laser in a 200-$\mu$m FP cavity without additional filtering. The ultra short length of the active medium in this bulk glass laser allows single-frequency, narrow-bandwidth (reportedly 0.85 kHz) operation tunable over about 1 nm by changing the temperature of the microchip. However, until recently lasing had not been demonstrated in fiber lasers with fiber lengths less than about a few centimeters even when high gain Er:Yb codoped fiber was employed. Kringlebotn et al., supra.

SUMMARY OF THE INVENTION

This invention provides multiple-cavity (also called compound cavity) fiber optic lasers combining high-gain fibers in low-loss, high-finesse fiber ferrule resonance cavity configurations supported in low-loss ferrule alignment fixtures developed for use in FFP filters. These lasers incorporate rare-earth doped, sensitized glass fiber as the active medium within FFP cavities. FFP lasers of this invention include those exhibiting single-frequency and/or single-polarization mode operation with wide mode separation. Lasers provided include those with short cavity lengths, which in this application is intended to mean independent cavities less than or equal to about 10 mm. In preferred embodiments, the longest independent cavities of the multiple-cavity lasers of this invention can be up to about 10 mm in length. Such short cavity lasers display more stable operation and ease of operation. These FFP laser sources are fixed-frequency or discretely-tunable. Multiple-cavity configurations in which at least one of the cavities formed contains active fiber are readily formed in fiber ferrule assemblies. FFP lasers can be end-pumped using single- or double-pass pumping configuration or pump resonance cavity configurations. Compound cavity FFP lasers of this invention can be readily and conveniently combined with fiber amplifiers to increase fiber laser output power. Ferrule assemblies and alignment fixtures afford simple, high-precision fiber alignment which is stable as a function of cavity tuning and over reasonable device operating temperatures. Wavelength tuning is achieved by controlled temperature variation of gain cavity length or by electromechanical variation of gain cavity length. The inventive lasers have good environmental stability and are compact for convenience of device packaging and thermal control. Discrete tuning allows stable wavelength tuning with wavelength spacing designed for a particular multi-wavelength communication system.

Single-frequency and/or single-polarization mode erbium:ytterbium glass multiple-cavity FFP lasers are provided, including those in which the longest independent cavity (not composite cavity) in the laser ranges up to about 10 mm. Lasers of this invention include those with wavelength tuning range over about 10 to 20 nanometers. Amplified single-frequency multiple-cavity lasers incorporating rare-earth ion doped fiber amplifiers are also provided. Single-frequency lasing employing short lengths of rare-earth doped sensitized fiber in a three-mirror laser cavity configuration is demonstrated.

BRIEF DESCRIPTION OF THE DRAWINGS

FIG. 2a is a three-mirror configuration and FIG. 2b is a four-mirror configuration.

FIG. 7a shows D of 4.81 nm for laser 1. FIG. 7b shows D of 7.55 nm for laser 3. FIG. 7c shows D of 9.59 nm for laser 4.

DETAILED DESCRIPTION OF THE INVENTION

Figure 1:
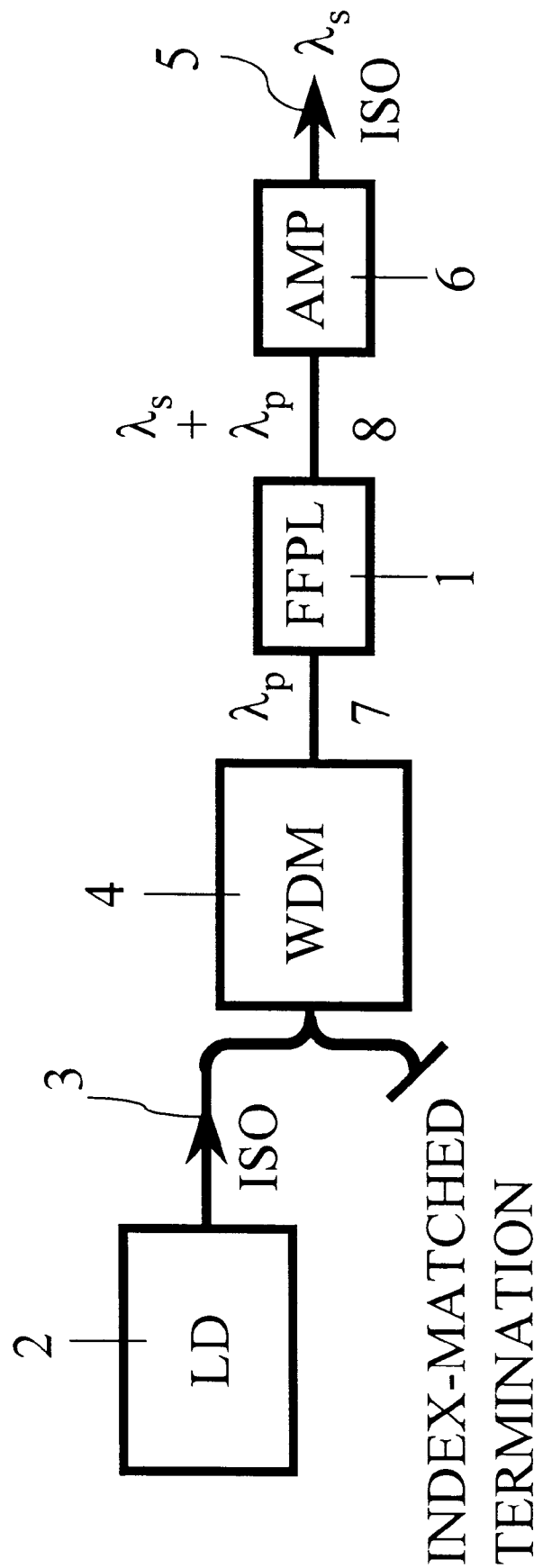
FIG. 1 is a schematic diagram of a fiber optic laser system with optional fiber amplifier.

To achieve lasing with sub-millimeter lengths of active fiber, the laser gain cavity (i.e., FFP resonator) must have low loss. For a single cavity fiber laser system the following equation represents the minimum active fiber length ($l_m$) required for lasing:

$$l_m = \frac{-1}{2\sigma_e A} \ln[R_1 R_2 (1 - L_R)]$$

where $\sigma_e$ is the effective stimulated-emission cross-section of the fiber (in $m^2$), A is the emitting dopant concentration in the fiber (in $m^{-3}$), $R_1$ and $R_2$ are the input and output mirror reflectivities and $L_R$ is the round-tip cavity loss which accounts for absorption in mirror coatings diffraction loss, and misalignment of the fibers in the cavity. The higher the fiber gain, the higher the reflectivity and the lower $L_R$, the shorter the length of fiber needed for lasing. Decreasing the length of the laser gain cavity results in more stable single-mode laser operation, increased spectral purity, larger FSR and wider tuning ranges for tunable lasers. Active fiber gain is a function of $\sigma_e$ and A, as well as a function of pump efficiency. Pump absorption in the active fiber, particularly rare-earth ion-doped active fibers can be significantly enhanced by addition of codopants which act as sensitizers absorbing pump photons and transferring energy to the emitting species, e.g. the rare-earth ion.

The FFP laser gain cavities of this invention are fabricated in fiber ferrule assemblies which were developed for use in FFP filters. Specifically, techniques employed to fabricate wafered ferrules as described in U.S. Pat. No. 5,212,746 are used to fabricate multiple cavities. These techniques allow highly precise construction of FFP laser cavities, including ultra-short cavities, i.e. those having sub-millimeter lengths, which can be conveniently and reproducibly aligned in low-loss, ferrule alignment fixtures. Low-loss ferrule alignment fixtures are used to support the ferrule assembly laser cavity and provide a means for adjusting cavity alignment. If necessary or desirable these fixtures can be temperature compensated to provide output wavelength stability over a range of device operating temperatures. Changes in ambient temperature can significantly effect resonance cavity length and output wavelength in FFPs. Wavelength drift as a function of temperature is minimized in temperature compensated FFPs. Alignment fixtures can also provide a means for selectively varying cavity length to tune fiber laser output. Certain fixtures are tunable by temperature control (i.e., heating or cooling). Other fixtures provide a means for electromechanically changing the cavity length, for example by use of piezoelectric transducers (PZTs). Electromechanical tuning using PZTs is preferred for applications requiring broad tuning range. The alignment fixtures described herein for use in multiple-cavity fiber lasers can achieve round trip loss of 0.002 or less and exhibit relatively low loss as a function of tuning.

The active fiber-containing ferrule assemblies and alignment fixtures of this invention can be combined to generate high finesse resonance cavities. Finesse up to 4000 can be obtained with techniques described.

Four factors are important for producing preferred low-loss, high-finesse laser gain cavities for FFP lasers. The use of low-loss $TiO_2/SiO_2$ multiple dielectric layers for mirrors; high precision polishing of fiber ends to achieve high precision fiber end perpendicularity to the fiber core (preferably 0.02° or less); high precision alignment and bonding in ferrule construction; and accurate, thermally stable fiber gap tuning.

The fiber optic lasers of this invention are described in more detail by reference to the drawings.

FIG. 1 schematically illustrates an exemplary FFP laser (FFPL) system of this invention. The FFPL (1) contains a fiber gain cavity formed within a fiber Fabry-Perot (FFP) ferrule assembly supported within a low-loss, high-finesse alignment fixture. A pump laser (2) appropriately coupled to the optical fibers of the laser gain cavity provides pump energy of wavelength $\lambda_p$ to the cavity. In the configuration shown the laser cavity is end-pumped. Pump output is introduced into the cavity after passage through a wavelength isolator (3) and a wavelength division multiplexer (4) which prevent feedback of pump radiation and laser output to the pump laser. The pump wavelength is chosen, as is well-known in the art, in view of the absorption spectrum of lasing material in the laser cavity. Absorption at $\lambda_p$ causes population inversion in the lasing material to induce lasing. A portion of the pump energy is thus absorbed in the laser cavity. Laser output $\lambda_s$ exits the cavity along with residual pump radiation. Cavity output is passed through a second wavelength isolator (5) to isolate $\lambda_s$. The laser output is then available for use in any desired application. Optionally the residual pump power at $\lambda_p$ and the laser output are passed into an optical amplifier (6), which absorbs residual pump power, preferably a fiber optical amplifier, again as is well-understood in the art, resulting in amplification of the laser output at $\lambda_s$. The amplified laser output is likewise isolated from any residual pump energy at isolator 5. Those of ordinary skill in the art will appreciate that the fiber laser output generated after 1 or the amplified output generated after 6 can be adapted for use in a desired application by means other than those specifically detailed in FIG. 1. The components of the fiber optic laser system of FIG. 1 are optically coupled using low-loss fiber splicing and coupling techniques well-known in the art. Multi-mode conversion of the pump wavelength in the input connectors should be minimized. In particular, where possible fiber having a cutoff at shorter wavelengths than the pump wavelength should be employed.

Figure 2A:
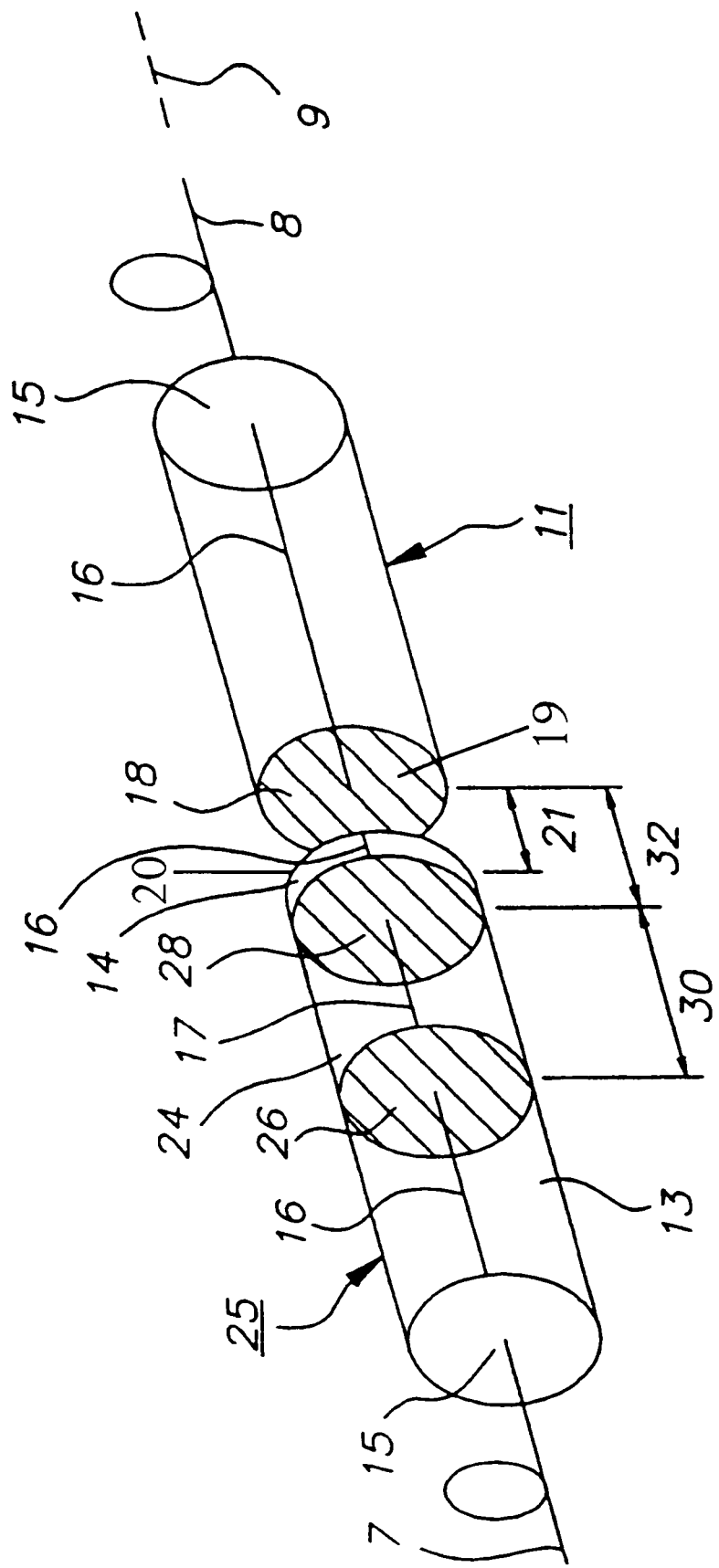
FIGS. 2a and 2b are exemplary FFP multiple-cavity laser ferrule assemblies.

The laser of FIG. 2a is a three-mirror configuration of a multiple-mirror fiber laser gain cavity configuration. This ferrule assembly contains a mirror-ended ferrule 11 with mirror 18 and a multiple-wafer ferrule 25. The multi-wafer ferrule has two wafers 14 and 24 and two embedded mirrors 26 and 28. Ferrules used to create ferrule assemblies for multiple-cavity lasers are typically cylinders each having an essentially axial bore 15 through which a stripped optical fiber 16 or active fiber 17 is threaded. The longitudinal axis 9 of the ferrule assembly is indicated. Fiber is fixed within the axial bore with an appropriate adhesive, e.g. an epoxy adhesive. The mirror-ended ferrule 11 and the multiple-wafer ferrule 25 contain fiber termini, i.e. fiber ends, at their internal ends (19 and 20, respectively) and fibers 7 and 8 extending from their external ends. The multiple-wafer ferrule also contains fiber ends at the embedded mirrors 26 and 28. At each fiber end in a ferrule, the fiber has been cut flush with the ferrule end-face and that end-face has been polished. Dielectric mirrors 18 and 26 were then deposited on the polished ends of ferrules 11 and 13 covering the fiber end. Mirror-ended ferrule 13 is then employed to construct a multiple-wafer ferrule.

A first wafered ferrule (24+13) was fabricated by bonding a ferrule to the mirrored end of ferrule 13 and reducing the length of the bonded ferrule by cutting, grinding and/or polishing to achieve the desired wafer length (i.e., the length of wafer 24). The resulting first wafered ferrule has embedded mirror 26. The internal fiber end of the wafered ferrule (24+13) is cut flush with the ferrule end, polished and a second dielectric mirror 28 is deposited at the wafer end. In an analogous manner, the second wafer 14 is added to the wafered ferrule to generate multiple-wafered ferrule 25 having two embedded mirrors.

Alternatively, mirror 26 can be initially deposited on the end of the ferrule which would ultimately be cut and ground to form wafer 24 before that ferrule is bonded to the other ferrule. In this case, the epoxy layer joining the wafer to the ferrule in the wafered ferrule produced would be within cavity 30.

The exemplified configuration of FIG. 2a contains (1) an active cavity 30, i.e., the cavity containing active fiber 17, in the multi-wafer ferrule between mirrors 24 and 28 and (2) a passive cavity 32, i.e. a cavity in which the fiber is not active, including fiber gap 21 formed between mirrors 18 and 26. Changing the length of the fiber gap changes the length of the passive cavity and tunes the wavelength. Note that a longer composite cavity (length 30+32) is formed between mirrors 24 and 28. The fiber laser configuration of FIG. 2 is discretely tunable by changing the length of the passive cavity.

In wafered and multiple-wafered ferrules, wafers are bonded to other wafers and ferrules using adhesive substantially transparent to optical transmissions through the fiber, e.g. a UV-cured epoxy. Where possible, it is preferred that adhesive layers bonding ferrules and wafers are external to the resonance cavity. Multiple-cavity FFP lasers of this invention can have more than one active cavity. For example, both cavities in the three-mirror configuration of FIG. 2a can include active fiber. Configurations having active fiber in both cavities are preferred for increased power output and more selective tuning.

Single-frequency laser operation with discrete wavelength-tuning is possible with the multiple-mirror fiber designs like that of FIG. 2a. A three-cavity FFP laser can also be fabricated in a ferrule assembly by combining two ferrules each having a single wafer and an embedded mirror where the third mirror is deposited at an internal end of one of the wafered ferrules.

Figure 2B:
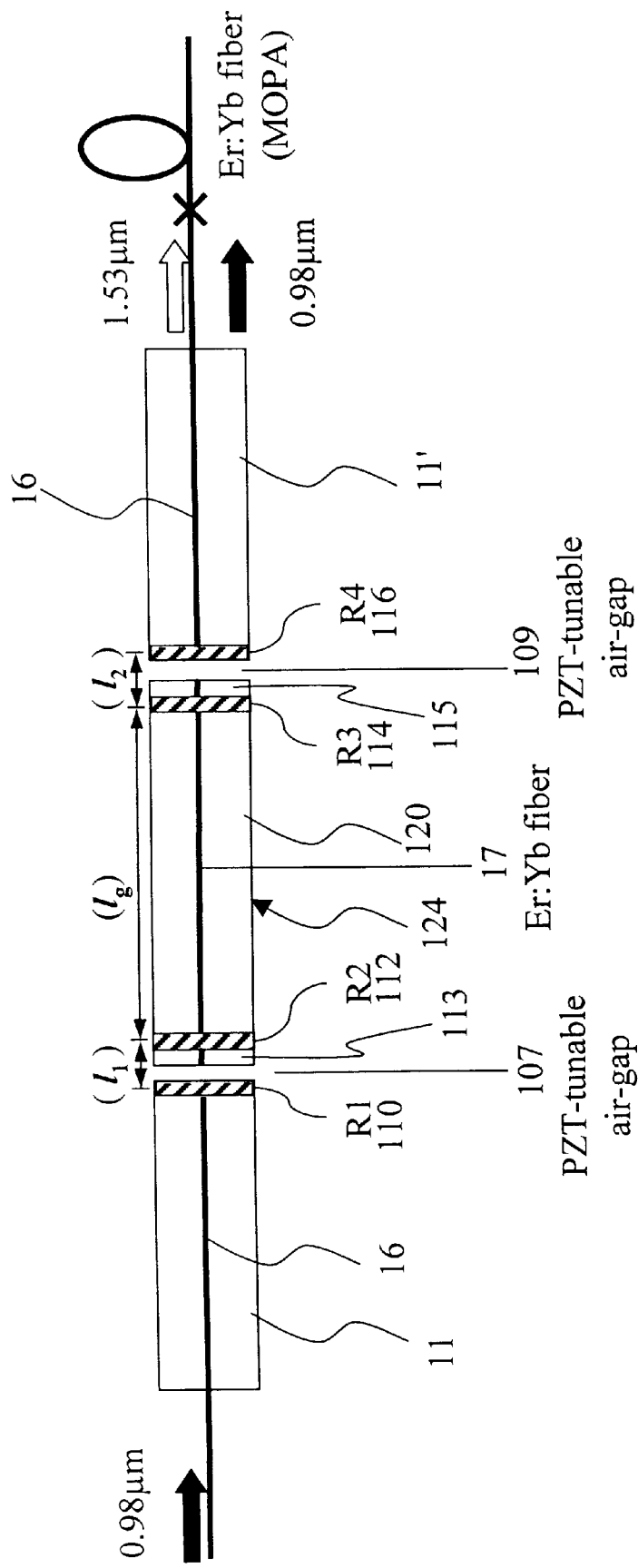

This invention also includes multiple-cavity configurations having more than three mirrors where at least one of the cavities is an active cavity, particularly those having four mirror created, for example, by combining two multiple-wafer ferrules. Another example of a four-mirror configuration is shown in FIG. 2b. This ferrule assembly combines 2 mirror-ended ferrules (11 and 11' having mirrors 110 and 116, respectively) and a central composite ferrule 124 having two end wafers 113 and 115 bonded to ferrule 120. Each wafer and ferrule of the assembly contains axial fiber and the assembly is aligned, with fixtures described below, to maximize optical transmission through the axial fibers of the assembly. The central composite ferrule contains two embedded mirrors 112 and 114 at the interface between the end wafers and ferrule 120. These embedded mirrors form cavity $l_g$ which is shown to contain active fiber 17. Cavity $l_1$ is formed between mirror 110 and mirror 112 and cavity $l_2$ is formed between mirror 114 and mirror 116. In the given configuration, cavities $l_1$ and $l_2$ are passive cavities containing passive fiber 16. Also in the configuration shown, $l_1$ and $l_2$ are different lengths and each contains a fiber gap (107 and 109).

The fiber laser configuration of FIG. 2b is discretely tunable by coordinated adjustment of the lengths of passive cavities $l_1$ and $l_2$. Alternatively, the cavities $l_1$ and $l_2$ can both be fixed in length or one can be fixed and the other tunable in length. Also alternatively, either or both of the these cavities in addition to cavity $l_g$ can be active, i.e., contain active fiber. Cavities $l_1$ and $l_2$ in the illustrated configuration can be tuned using methods, including electromechanical methods, described below. For example, the configuration of FIG. 2b can be tuned using two ferrule alignment fixtures with PZTs, one for each fiber gap, as described below.

The composite ferrule 124 is constructed employing techniques described herein for the construction of wafered ferrules.

The theory and operation of multiple cavity tuning is well understood in the art. See: A. E. Siegman, (1986) *Lasers*, University Science Books, Mill Valley, Calif.; G. P. Agrawal and N. K. Dutta (1986) *Long Wavelength Semiconductor Lasers*, Van Nostrand Rheinhold Comp., New York. These references are incorporated by reference in their entirety herein.

Ferrule assemblies for fixed-wavelength FFP laser operation can be constructed by rigidly bonding aligned ferrules together to form the fiber laser gain cavity. For example, the internal ends of a mirror-ended ferrule and a wafered ferrule with embedded mirror can be directly bonded together to form such a fixed length laser gain cavity. Prior to bonding, the fibers in the opposed ferrules are aligned, for example in a rotary mechanical splice fixture using the rotary alignment technique as described in U.S. Pat. Nos. 4,545,644 and 5,212,745. Bonding of such assemblies is preferably done with UV-curable epoxy applied at the ferrule joint before alignment which is cured after the fibers are aligned to bond the ferrules in alignment. The bonded ferrule assembly can be removed from the rotary mechanical splice. Alignment fixtures are not required for these bonded assemblies. Fixed cavity FFP lasers having bonded ferrule assemblies can be wavelength tuned by changing the temperature of the ferrule assembly to change the length of the laser gain cavity.

A multiple-wafer ferrule is constructed essentially as is a wafered ferrule. After the first wafer is bonded to the mirror-ended ferrule to form the first embedded mirror, the non-bonded end of the first wafer is polished to produce a highly parallel face to which a second mirror-ended ferrule is bonded. The second wafer is formed by cutting or grinding the second mirror-ended ferrule.

Ferrules are typically drawn glass, such as Pyrex™ or quartz, or may be fabricated from ceramic. Wafered ferrules are prepared by (alignment and) bonding of fiber ferrule with a mirror-ended fiber ferrule after which the mirror-ended ferrule is shortened to form the wafer by cutting and/or grinding. Typically wafers can be readily prepared in lengths from about 5 $\mu$m to several millimeters. For applications to fiber optic lasers of this invention, wafers ranging from about 5 $\mu$m to about 10 mm are presently of most interest. Construction of ferrules and wafered ferrules is described in detail in U.S. Pat. Nos. 5,212,746 and 5,062,684 which are incorporated by reference in their entirety herein. For application to the preparation of FFP laser cavities of this invention it is important that the opposing ends of the ferrules and/or wafers forming the resonance cavity are polished to be essentially parallel. It is also important that fiber ends are polished to be essentially perpendicular to the fiber core axis. The degree of perpendicularity of polishing of the fiber end to the fiber core axis is preferably within about 0.02° and more preferably within about 0.01°.

In general any means for integrally forming a low-absorption, high-reflectivity mirror on a ferrule can be employed in the FFP lasers of this invention. Low-loss FFPs can be constructed with mirrors formed by deposition of multiple dielectric layers, such as $Si/SiO_2$ layers. Improved low-loss mirrors are formed by deposition of $TiO_2/SiO_2$, as described in J. Stone and L. W. Stulz (1991) Electronics Letts. 27(24):2239–40. Those of ordinary skill in the art appreciate that mirror reflectivity varies as a function of wavelength. The mirrors that form the laser gain cavity generally require high reflectivity at laser output wavelengths ($\lambda_s$) and for single- and double-pass pumping configurations should substantially transmit the pump wavelength ($\lambda_p$). Pump resonance cavity pumping configurations require mirrors the reflect at $\lambda_p$ forming a pump resonance cavity including the laser gain cavity. Techniques well-known in the art can be used to select mirrors with reflectivity appropriate for various combinations of $\lambda_s$ and $\lambda_p$. It is not necessary that the entire ferrule end be covered by the deposited mirror. Only the central portion of the ferrule end, specifically the fiber end must be covered by the mirror. It is preferred at least for embedded mirrors, that the deposited mirror does not cover the entire ferrule or wafer end to facilitate bonding between wafers and ferrules.

The use of index matching material in fiber gaps is optional in FFP lasers. It should be determined empirically in a particular device design for a particular application whether or not the use of index matching material is beneficial to achieving desired laser output.

In general any type of high gain active fiber, emitting at any wavelength, can be adapted by choice of pump laser, non-active fiber and mirrors for use in the ferrule assemblies described herein to form a laser. Generally, those active fibers with gain high enough to support lasing in a fiber less than about 10 millimeter long can be readily adapted for the FFP lasers herein. More specifically, high gain fibers, particularly any rare-earth doped fibers with gain comparable to Er:Yb codoped fibers as exemplified herein can readily be adapted for the FFP lasers herein. Active fibers particularly suited for use in the FFP lasers are high gain fibers doped with rare-earth ions, including among others neodymium and hohnium ions.

It will be appreciated by those in the art that high gain Er fibers with $\lambda_s$ about 1.5 nm can be generated by inclusion of sensitizers other than Yb and in host glass other than phosphate glass and phospho-silica glass.

The active glass fibers used in FFP lasers of this invention are available from commercial sources or can be made by techniques well-understood in the art. See, for example, J. E. Townsend et al. (1991) Electronics Letts. 27(21):1958–1959; J. E. Townsend et al. (1992) Materials Res. Soc. Symp. Proceedings 244:143–147 (Materials Research Society).

Ferrule alignment fixtures provide a support means for holding and securing the ferrule elements of the ferrule assembly such that the fibers of the ferrules are aligned to allow optical transmission through the ferrule assembly. The fibers are preferably aligned to maximize transmission through the assembly. In general, an alignment fixture has a means for receiving ferrules or wafered ferrules, such as a passage within the body of the fixture, so that the internal ends of the ferrule elements can be opposed and the fibers therein can be aligned to form the laser gain cavity. The alignment passage itself is constructed to high tolerance and can be formed, for example, by high precision machining through a fixture body to result in a substantially smooth, substantially straight passage which will accommodate cylindrical ferrule assembly elements. The passageway can be shaped as described below to provide multi-point contact, preferably three-point contact, between the ferrule and passageway. The alignment fixture optionally provides a means for adjusting the relative alignment of the fibers in the ferrule assembly. To achieve a low-loss laser gain cavity, high precision alignment of the optical fibers through the cavity is required.

Exemplary alignment fixtures suitable for use in the fiber optic lasers of this invention include those described in U.S. Pat. Nos. 5,212,745, 5,289,552, 5,422,970 and pending U.S. patent application Ser. No. 08/135,679 filed Oct. 13, 1993.

Figure 3:
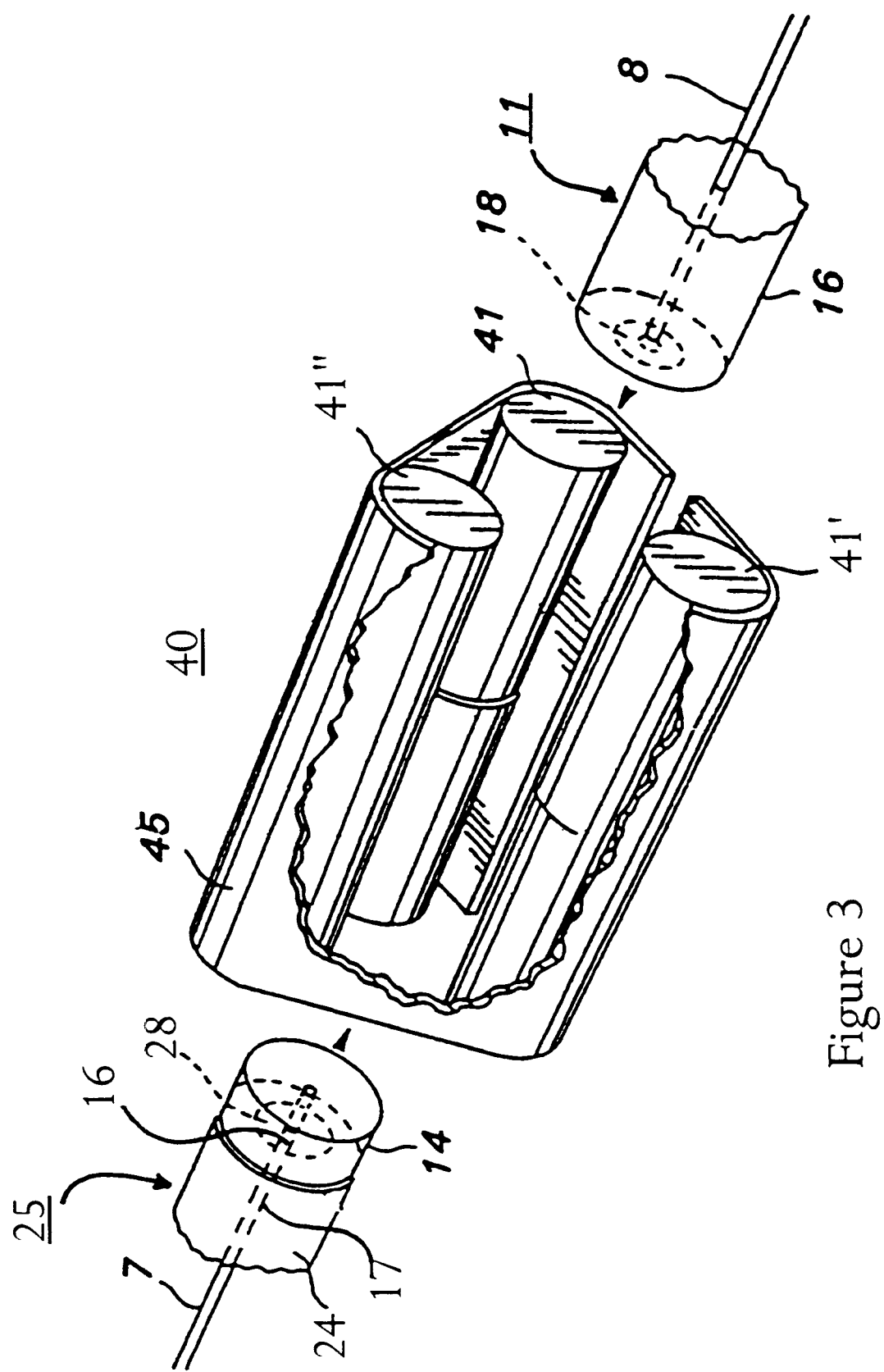
FIG. 3 is a partial cut-away view of a low-loss, high-finesse ferrule alignment fixture useful particularly for creating fixed frequency FFP lasers. The view indicates introduction of the ferrules of a ferrule assembly of FIG. 2a onto the fixture.

A rotary mechanical splice alignment fixture, as illustrated in FIG. 3, can be employed for fixed-wavelength operation or for temperature tuning of the FFP lasers of this invention. This fixture was described in U.S. Pat. No. 4,545,644, with particular reference to FIG. 3 therein, for use in fiber splicing. A detailed description of its construction and operation is given in U.S. Pat. No. 4,545,644 which is incorporated, in its entirety, by reference herein. U.S. Pat. No. 5,212,745 describes the use of the rotary mechanical splice in fixed and temperature-tunable FFPs and is also incorporated by reference in its entirety herein.

The rotary mechanical splice 40 comprises a plurality of, preferably three, alignment rods (41, 41' and 41") held within a spring bracket 45. The essentially cylindrical alignment rods are shown in the three corners of the triangular spring bracket. The alignment rods provide multi-point, preferable three-point, support for ferrules 11 and 25 inserted into the passage formed by the alignment rods. The ferrules are inserted into the rotary mechanical splice, the spacing between the internal ends of the ferrules is adjusted to form a gap, i.e. a fiber gap, which is adjusted to maximize emission of a desired wavelength. The gap also allows for variations in the cavity length, e.g. as a function of temperature change. The gap is small, typically about 1 $\mu$m, but preferably not more than about 3 $\mu$m, since diffraction loss increases with increasing gap size. The gap can be filled with an index matching material. At least one of the rods, preferably two in a three-rod splice, includes a "flat" as defined in U.S. Pat. No. 4,545,644, extending along the rod from one end for a substantial fraction of the length of the rod.

In the fixture of FIG. 3, alignment rods 41 and 41' carry flats. Ferrule 11 contacts the flat of alignment rod 41 and multiple-wafered ferrule 25 contacts the flat of alignment rod 41'. Typically, the flat extends over about one half of the length of the rod, but unsymmetrical rods will function equivalently. Ferrule assembly elements, ferrules, wafered ferrules or multiple-wafered ferrules are inserted into the splice and aligned therein essentially as described for insertion and alignment of capillary cylinders in U.S. Pat. No. 4,545,644. The spring bracket 45 holds the ferrule assembly elements in rigid contact with the alignment rods which constitute the body of the fixture. For operation of the rotary mechanical splice for alignment, an inserted ferrule must be in rigid contact only with the flat portion or the cylindrical portion of any one alignment rod.

The outside diameters of the wafers 14 and/or 24 of the wafered or multiple-wafered ferrule can be made smaller than that of the ferrule to which they are bonded to avoid rigid contact between the wafer and the body of the alignment fixture.

The rotary alignment technique as described in U.S. Pat. No. 4,545,644 requires an alignment fixture offset. This feature increases the offset between the fiber axes of the two ferrules in the fixture and is introduced in these alignment fixtures to facilitate rotary alignment of ferrules. In practice, it has been found that most often it is not necessary to introduce such an offset, since there is typically sufficient axis offset between any two commercial ferrules selected for construction of the assembly.

In the fiber optic laser of FIG. 3, the laser cavity lengths are selected by choice of wafer length and fiber gap length. The wavelength emitted by the laser is then be tuned by selectively varying its temperature causing the ferrule assembly and splice fixture to expand or contract thereby changing length. As described in U.S. Pat. No. 5,212,745 for temperature tuning of FFPs, resistive heating elements or thermoelectric heater/coolers placed in thermal contact with the FFP laser can be used for temperature tuning. Alignment fixtures that are useful in temperature tunable FFP lasers allow laser cavity length to vary with temperature without substantial detriment to axial alignment of the ferrule assembly.

Ferrule alignment fixtures for use in wavelength tunable FFP lasers can alternatively comprise a means for electro-mechanically changing the laser cavity length. FIGS. 4A–C, 5A–C and 6A–B provide exemplary ferrule alignment fixtures in which piezoelectric transducers (PZTs) are used to change cavity length.

Signal loss due to wavelength drift and increased fiber misalignment as a function of temperature can be a significant problem in FFPs. Stacked PZTs such as those used in the laser alignment fixtures of FIGS. 4–6, require higher voltages at higher temperatures to achieve the same change in length and thus effectively have a large negative temperature coefficient. A PZT-tuned FFP laser will exhibit wavelength drift as a function of temperature reflecting the aggregate longitudinal temperature coefficient of the ferrule assembly and alignment fixture including the negative temperature coefficient of the PZTs. An uncompensated FFP, like that of U.S. Pat. No. 5,062,684 or EP application 0 457 484, can exhibit a relatively large change in cavity length with temperature, of the order 0.05 $\mu m/^\circ$ C. which can represent drift of a full FSR (free spectral range) over 15° C. While it is possible to employ wavelength locking techniques as described in C. M. Miller and F. J. Janniello (1990) Electronics Letters 26:2122–2123; I. P. Kaminow (1987) Electronics Letters 23:1102–1103 and D. A. Fishman et al. (1990) Photonics Technology Letters pp.662–664 to prevent significant signal loss from wavelength drift with temperature, high voltage power supplies, i.e., +/−60 volts, are required to achieve wavelength control over a reasonable temperature range unless FFPs are temperature compensated. Temperature compensated FFP designs are preferred for use in wavelength-tunable fiber lasers of this invention. The alignment fixtures of FIGS. 4–6 combine means for passive temperature compensation, i.e. balancing temperature coefficients by choice of materials, and means for adjusting the temperature coefficient of the FFP laser after it is constructed.

Figure 4A:
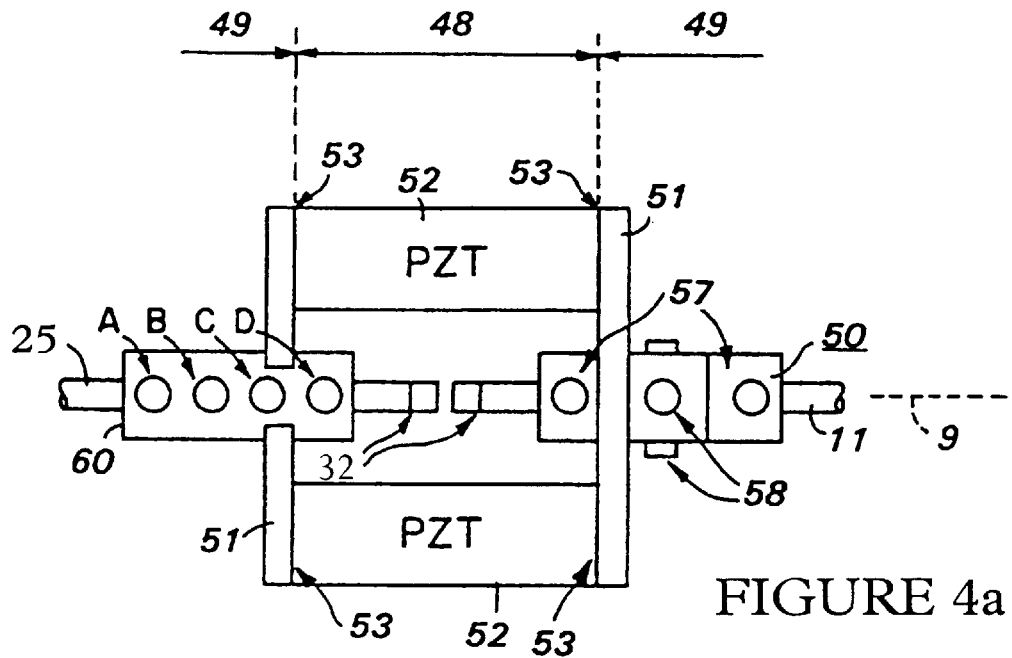
FIG. 4A is a schematic representation of an exemplary low-loss, high finesse, temperature compensated ferrule alignment fixture useful for constructing fiber optic lasers of this invention. A FFP laser ferrule assembly of FIG. 2a is shown in place within the fixture. This fixture is described in U.S. Pat. No. 5,289,552.

FIG. 4A is a schematic drawing of a PZT-tuned temperature compensated FFP laser. The laser has an alignment fixture composed of two ferrule holders or supports (50) and (60) connected to each other by a bridge of brackets (51) extending outwardly from the holders and bridging PZTs (52). Ferrule holder 50 has a means for adjusting the relative alignment of the ferrules in the filter, while the second ferrule holder 60 provides a means for adjusting the temperature coefficient of the laser after it is constructed. The fiber laser of FIG. 4A also has the passive temperature compensation feature of using controlled epoxy layers at the joints (53) between PZTs 52 and brackets 51 which compensates for the high negative temperature coefficient of the PZTs.

Figure 4B:
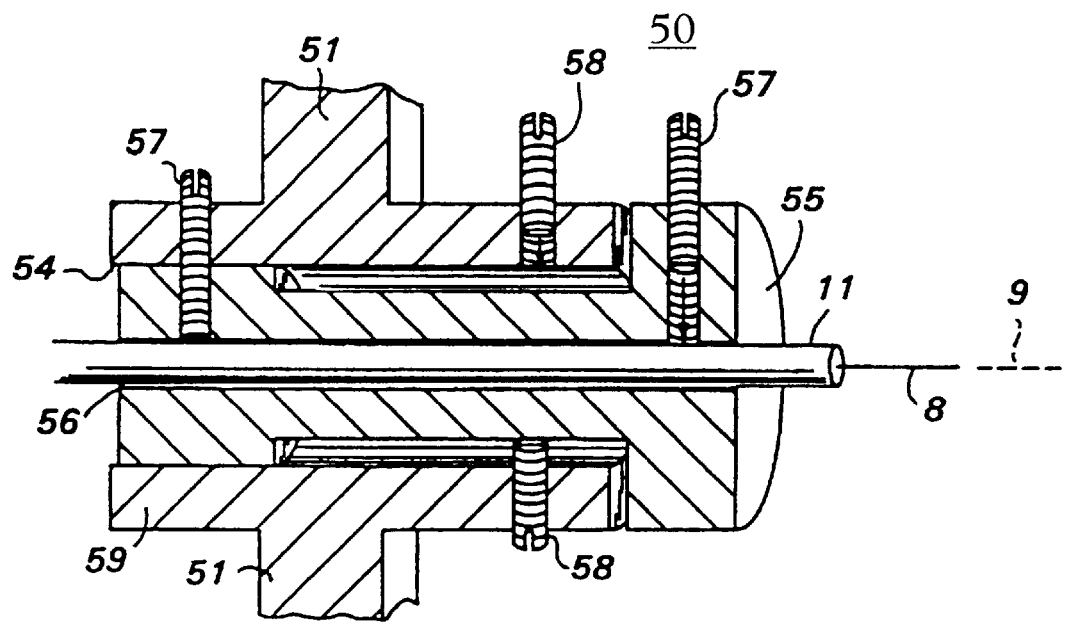
FIG. 4B is a longitudinal cross-sectional view of a ferrule holder of the fixture of 4A that provides a means for adjustment of the relative axial alignment of the ferrules in the fixture.

FIG. 4B is a cross-sectional view of the ferrule holder 50 of the fixture of FIG. 4A. This ferrule holder has a substantially cylindrical passageway (54) in the holder body (59) for receiving a stepped sleeve (55) with passage (56) into which the ferrule is received. Mounting screws (57) traverse the body of the holder and the sleeve to directly contact the ferrule within the passageway and secure it within the fixture. Alignment screws (58), typically four, are symmetrically disposed around the longitudinal axis (9) of the fiber laser.

Figure 4C:
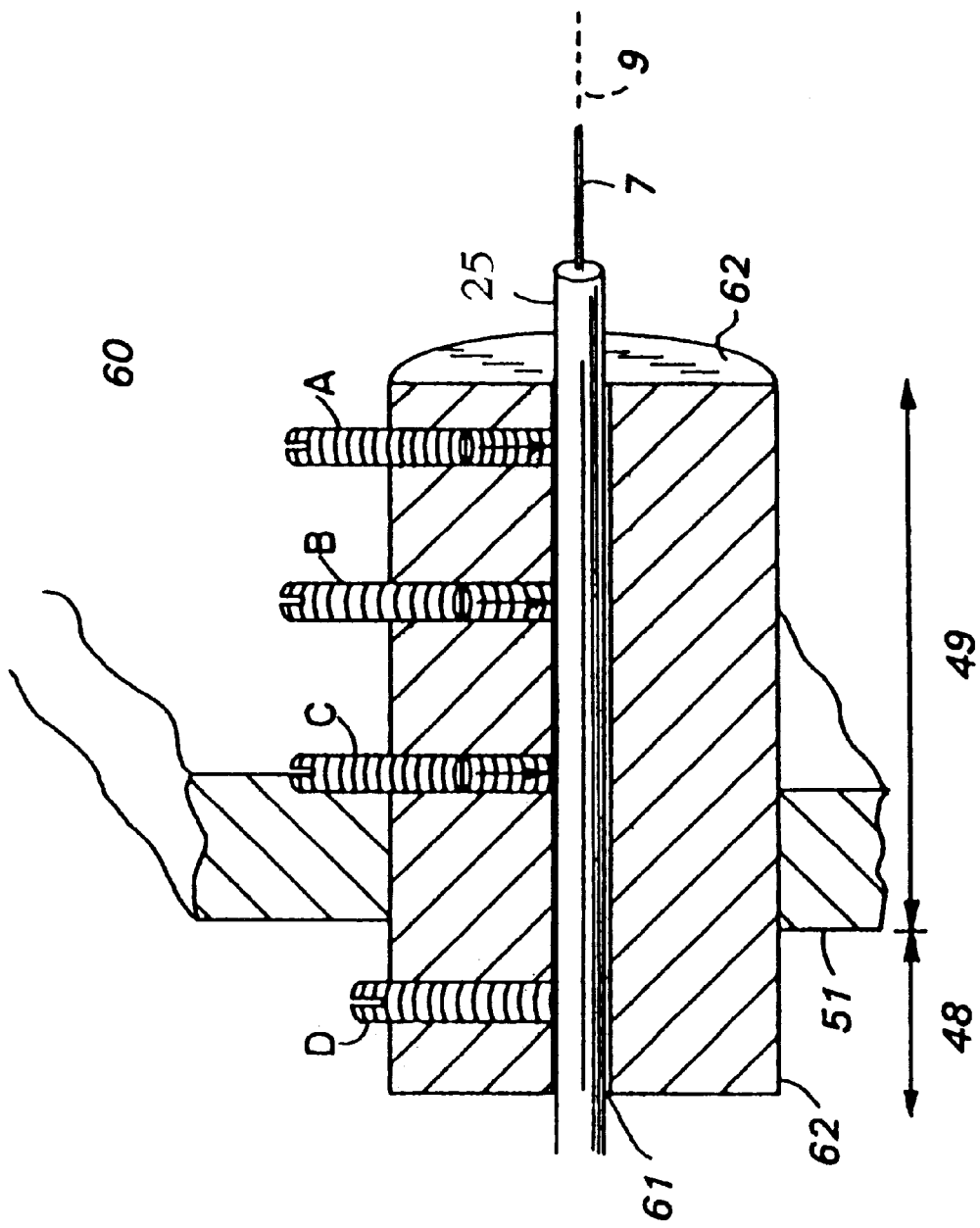
FIG. 4C is a longitudinal cross-sectional view of the other ferrule holder of the fixture of FIG. 4A which provides a means for adjusting the temperature coefficient of the laser cavity by changing the points of contact between the ferrule and the holder passageway.

FIG. 4C is a cross-sectional view of the second ferrule holder 60 of the fixture of FIG. 4A. A substantially cylindrical passageway (61) for directly receiving the ferrule (25) extends along the longitudinal axis (9) of the fixture. A plurality of mounting screws A, B, C, D (four are shown) traverse the holder body (62). When tightened the mounting screws enter passageway 61 to contact the ferrule holding it securely within the holder. Mounting screws extend along the length of the holder preferably entering the passage from the same direction. As shown in FIG. 4A, the joints between brackets 51 and PZTs 52 define an inboard region (48) and outboard regions (49 and 49') of the fixture. There is thus, as indicated in FIG. 4C, an inboard region (48) of the ferrule holder inside of the brackets and an outboard region of the ferrule holder outside of those brackets (49).

The means for adjustment of wavelength drift, i.e. adjustment of temperature compensation, in the alignment fixture of FIG. 4, comprises a means for varying the contact points between the ferrules and the ferrule holder along the passageway. At least one contact point is in the inboard region of the holder and at least one contact point is in the outboard region of the holder. In general, means are provided in a holder for a plurality of contact points with the ferrule. A holder preferably has means for making more than two contacts with the ferrule within the holder. The ferrule holder exemplified in FIG. 4C has four mounting screws, which define four contact points with the ferrule. Three of the mounting screws (A, B, C) are in the outboard region and one mounting screw (D) is in the inboard region. Changing the position of the contacts points between the ferrule and the holder body increases or decreases the amount of positive temperature coefficient material that contributes to the overall cavity length temperature coefficient of the filter.

A FFP laser like that of FIG. 4A, is constructed as described in U.S. Pat. No. 5,289,552 for FFPs by first determining the amount of positive temperature coefficient adhesive required to balance the negative temperature coefficient of the PZTs. This is done in a test filter as described therein. The amount of adhesive is readily controlled by controlling the thickness of the adhesive layers between the ends of the PZTs and the brackets of the holders using gauge wires of precise known diameter. Epoxy layers were controlled by use of substantially non-deformable steel gauge wire spacers inserted between the surfaces to be bonded (PZT ends and holder bracket faces). The required thickness of the epoxy layers was determined with all mounting screws of holder 60 tightened in contact with the ferrule. The epoxy thicknesses determined in the test device are then used to construct other FFP devices of the same design, size and materials. Once a FFP laser with controller epoxy thicknesses is constructed wavelength drift can be minimized by adjustment of the contact points with the ferrule. Details of passive temperature compensation and adjustment of temperature coefficients of FFPs are provided in U.S. Pat. No. 5,289,552, and all generally apply to temperature compensation of FFP lasers.

Figure 5A:
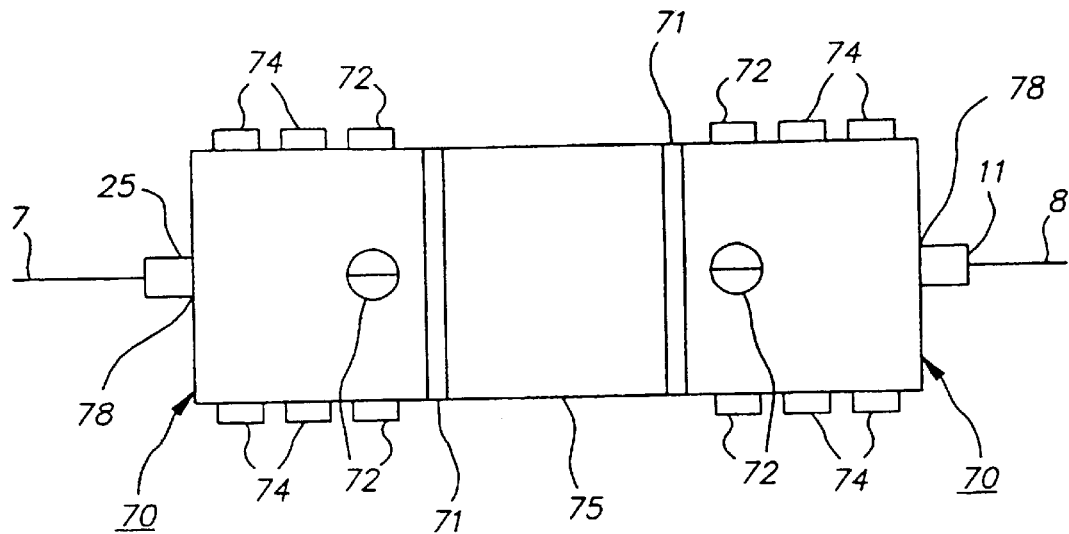
FIG. 5A is a schematic representation of a second exemplary low-loss, high finesse, temperature compensated ferrule alignment fixture useful in the construction of fiber optic lasers of this invention. A FFP laser ferrule assembly of FIG. 2a is shown in place within the fixture. This fixture is described in U.S. patent application Ser. No. 08/135,679, filed on Oct. 13, 1993. The ferrule holders have one set of four screws around the holder for alignment and a series of screws in line along the length of the holder to provide temperature compensation.

A second exemplary ferrule alignment fixture with PZT wavelength tuning and temperature compensation is illustrated in FIG. 5A. This alignment fixture was described in U.S. patent application Ser. No. 08/135,679 filed Oct. 13, 1993, which is incorporated in its entirety by reference herein. Two substantially identical ferrule holders (70) are joined to a cylindrical PZT (75) by controlled thickness epoxy layers (71). The ferrule holders have one set of four screws (72) for alignment and a series of screws (74) in line along the length of the holder to provide temperature compensation. The screws also function to secure the ferrules (11 and 25) within the holder passageway. Screws 72 are adjusted to achieve desired alignment. The remaining screws 74 are tightened or loosened as necessary to achieve a desired temperature compensation.

Figure 5B:
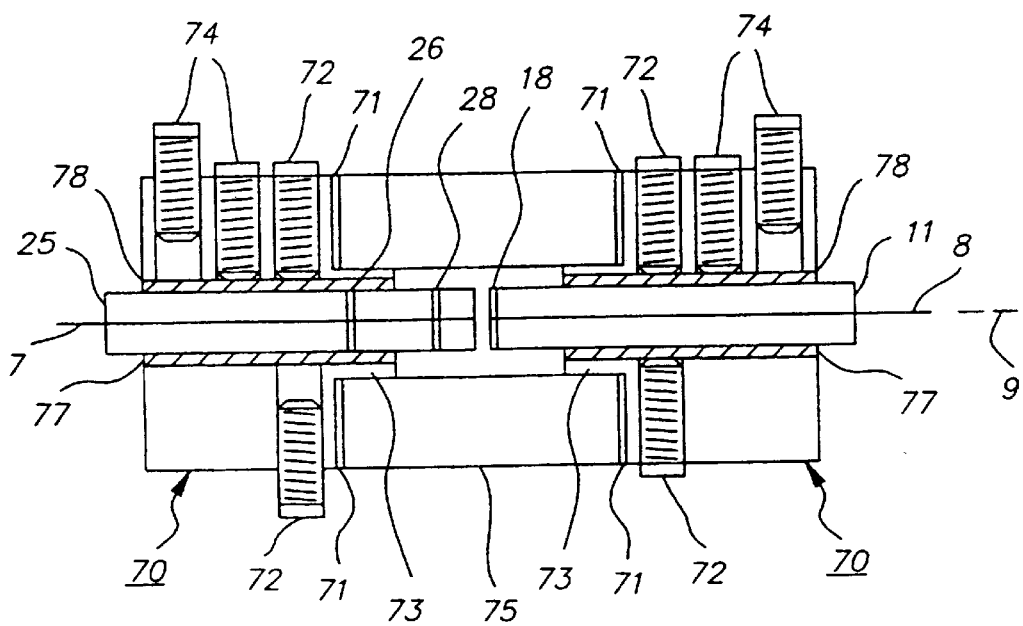
FIG. 5B is a longitudinal cross-sectional view of the alignment fixture of FIG. 5A.

FIG. 5B is a cross-sectional view of the fiber laser of FIG. 5A showing the position of a three-mirror ferrule assembly within the filter. In this case, a multiple wafer ferrule (25) is combined with a mirror-ended ferrule (11) to form the optical cavity. A sleeve (77) is interposed in the passageway (78) of the holder such that the screws (72 and 74) contact the sleeve which in turn contacts the ferrule. The internal end of the holder is bonded to the end of the single cylindrical PZT (75) and the passageways in the PZT and the holders are aligned so that the internal ends of the ferrules can be inserted into the holders and extend into the PZT. Application of an electric field across the PZT causes it to elongate longitudinally and thereby increase the optical cavity length. The internal end of each holder has a flange (73) around the circumference of the internal exit of the holder passageway. This flange is designed to fit inside the passageway of the PZT to keep adhesive out of the optical cavity. Epoxy thickness is controlled by the use of gauge wires as described in detail in U.S. Pat. No. 5,289,552.

Figure 5C:
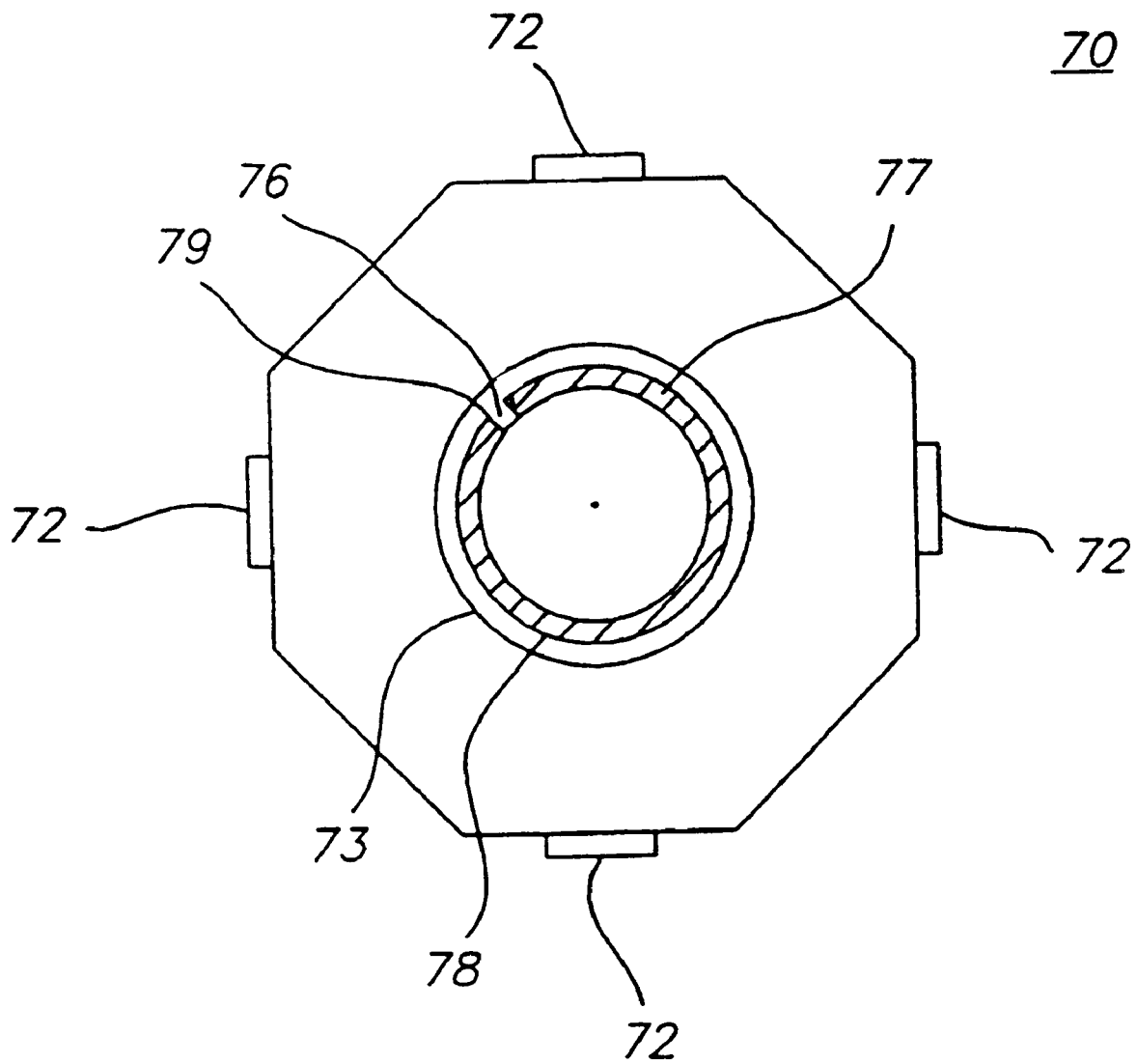
FIG. 5C is a radial cross-sectional view of an internal end of a ferrule holder of the fixture of FIG. 5A with a slotted sleeve in place such that the keyway of the holder is engaged in the slot in the sleeve. The flange which extends outwardly from the holder body is indicated.

FIG. 5C is a view of the internal end of a ferrule holder 70. This view shows a keyway (76) which extends the length of the holder passageway. The sleeve (77) is slotted along its length so that the when the sleeve is in place in the passageway the keyway of the holder is engaged in the slot in the sleeve. The slotted sleeve (77) is shown in place with its slot (79) engaged in the keyway (76). Flange (73) is shown extending outward from the holder body around the holder passageway (78).

The screws 72 and 74 in holder 70 are preferably sealed with a silicon thread sealer to keep moisture out of the FFP. Screws employed are typically made of the same material as the holder, preferably stainless steel. Screws with cupped-ends which tightly grip the surface against which they are tightened are preferably employed for alignment while screws with flat ends are preferably employed as screws 74 for creating contact points along the length of the holder passageway.

Screws 72 and 74 do not make a direct contact with the glass ferrule in holder 70. Sleeve 77 is inserted in each holder around the circumference of the ferrule. The screws contact the sleeve which in turn contacts the ferrule to secure it within the holder. The sleeve is employed to distribute the load on the glass due to tightening the screws. A phosphor bronze sleeve of the type typically used in fiber optic connectors was initially employed. The use of the sleeve in the FFPs significantly decreases ferrule breakage, particularly in miniaturized configurations. The sleeve provides an unexpected advantage for temperature compensation since finer adjustment of the temperature coefficient was possible when the sleeve was interposed. The interposition of the bronze sleeve between the stainless steel holder/screws and the glass ferrule functions to reduce the effect of each screw change on the overall temperature coefficient of the filter. This effect is believed to be attributable in part to the significantly higher positive temperature coefficient of bronze ($19 \times 10^{-6}/°$ C.) compared to that of stainless steel ($10.3 \times 10^{-6}/°$ C.) used in the holder. Metals having similarly high positive temperature coefficients and suitable mechanical properties are suitable for sleeves in the holder of FIG. 5A.

Alignment of one or both ferrules can be adjusted for example by tightening or loosening screws 72 within a set of screws positioned equiangularly around the circumference of the holder passageway. The screws are tightened or loosened with respect to each other to achieve maximum signal through the filter.

Figure 6A:
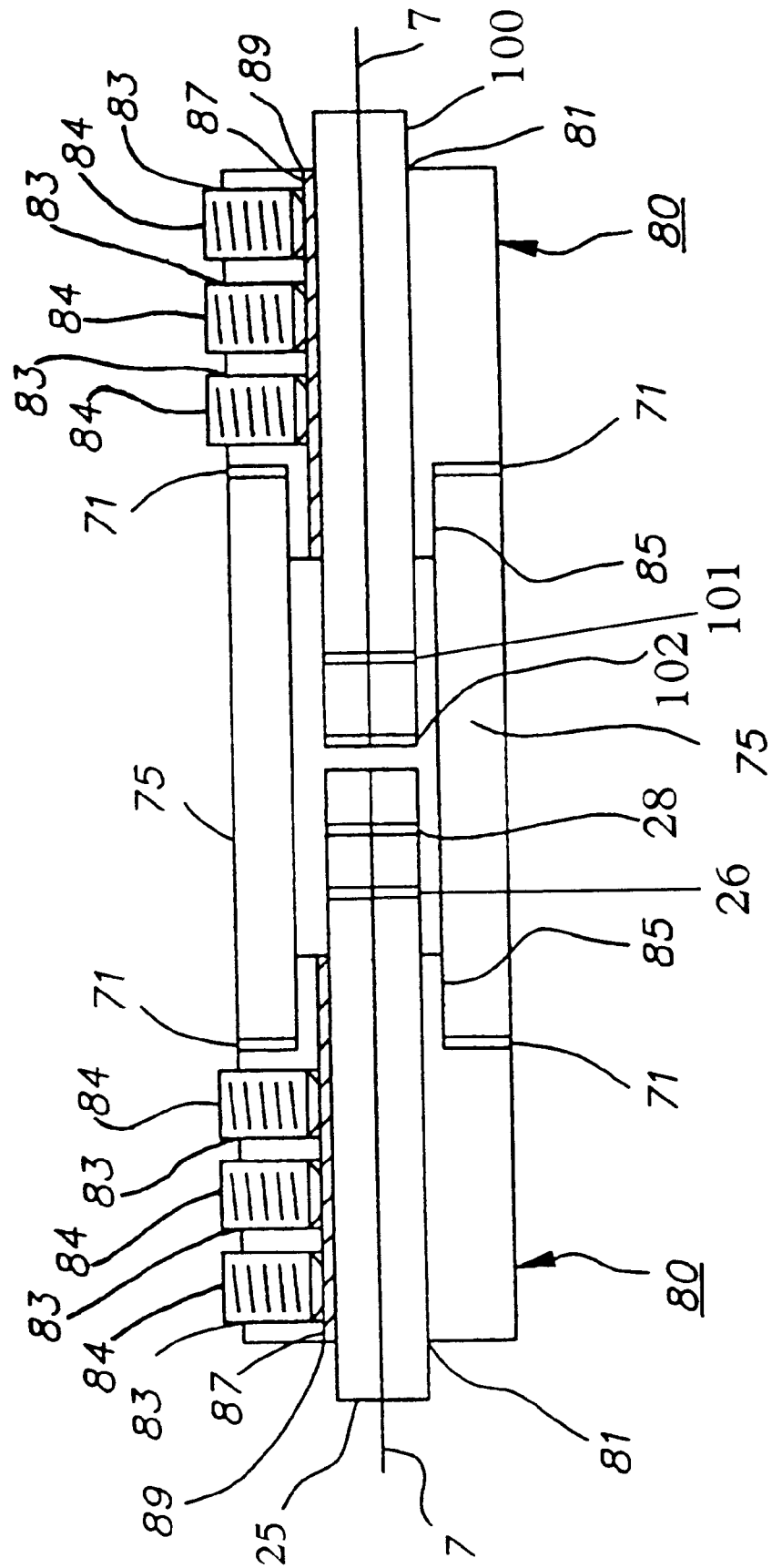
FIG. 6A is a longitudinal cross-sectional view of a third exemplary low-loss, high finesse, temperature compensated ferrule alignment fixture useful in the construction of fiber optic lasers of this invention. The FFP laser ferrule assembly of FIG. 2a is shown in place within the fixture. This fixture is described in U.S. Pat. No. 5,422,970, issued Jun. 6, 1995.

FIG. 6A illustrates a preferred alignment fixture for fiber lasers of this invention. The fixture is illustrated with a fiber laser ferrule assembly combining a multiple-wafered ferrule (25) with a mirror-ended wafered ferrule (100) with embedded mirror 101 and end mirror 102. This fixture has general features in common with the fixture of FIG. 5A and is described U.S. Pat. No. 5,422,970. The fixture has two ferrule holders (80) bonded on either side of a cylindrical PZT (75) so that the FFP laser gain cavity is formed within the passage way through the PZT. A distinct and important feature of the ferrule holders of the fixture of FIG. 6A is that the fibers in the ferrule assembly can be aligned in the fixture using an incremental rotary alignment technique, such as that used in alignment of rotary mechanical splice fixtures as described in U.S. Pat. Nos. 4,545,644 and 5,212,745. Holder 80 has a body 79 with a ferrule passageway (81) shaped to provide three-point contact between the holder and a ferrule around the circumference of the ferrule. Shaping of passageway 81 to achieve this three-point contact is illustrated in the radial cross-section of FIG. 6B.

Figure 6B:
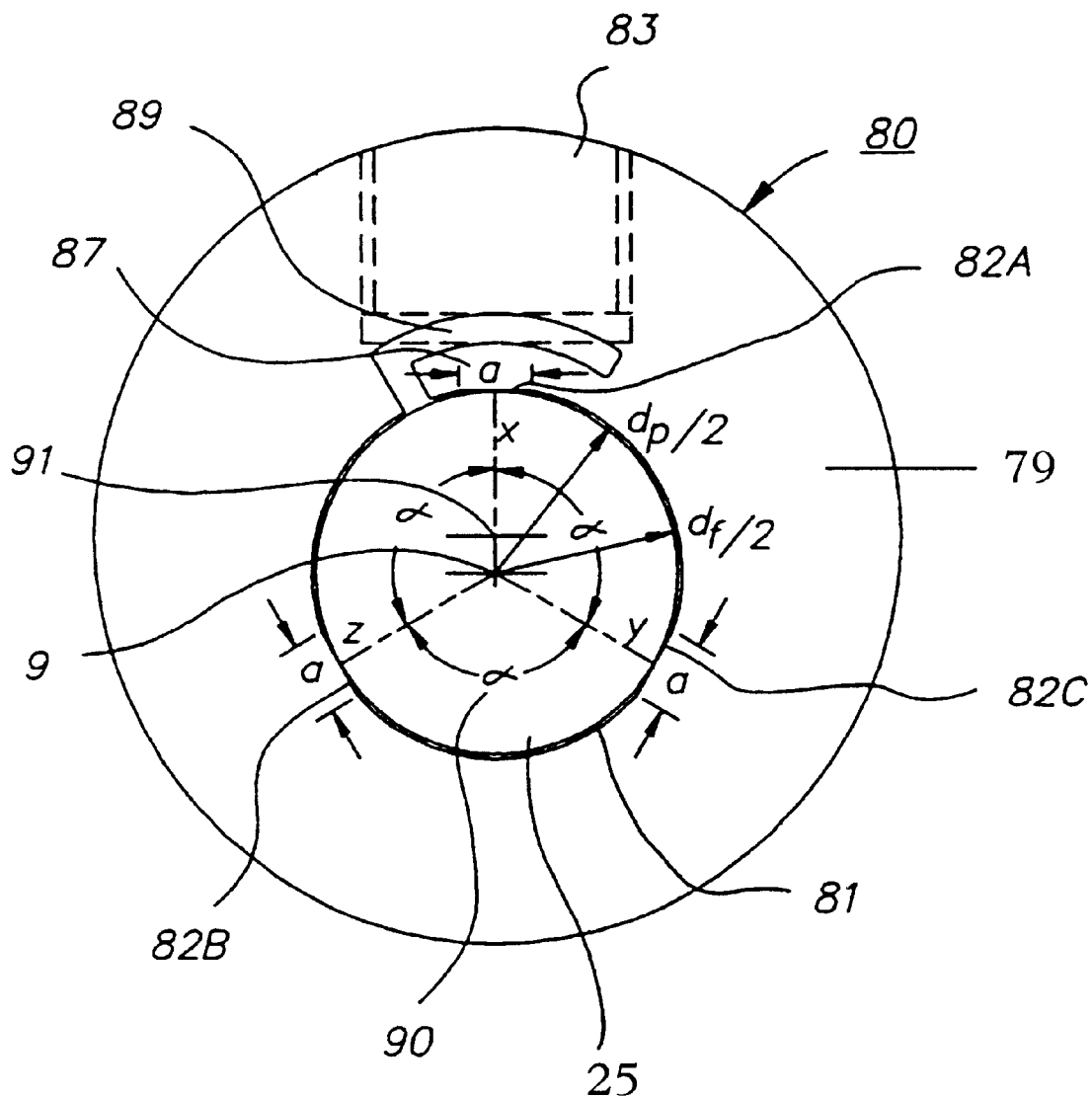
FIG. 6B is a radial cross-sectional view of the ferrule alignment fixture of FIG. 6A showing an exemplary holder passageway shaped for three-point contact. The ferrule retention means is a resilient arm extending from the body of the holder.

In the ferrule holder of FIG. 6A, passageway 81 extends the length of the holder and the means for securing a ferrule in the holder is a plurality of tapped holes 83 with screws 84, three screws are shown, in a line along the length of the holder. A ferrule retention means 87 is intermediate between the bottom of tapped holes 83 and passageway 81. An exemplary ferrule retention means is shown in FIG. 6B. Holder 80 also has a means for receiving a PZT, flange 85, at the internal longitudinal end of the holder around the circumference of the internal exit of the holder passageway. This flange is designed to fit inside the passageway of the PZT 75 to keep adhesive out of the optical cavity. The outer diameter of the flange is thus sized to receive a cylindrical PZT. The flange is inserted into the cylindrical passageway along the axis of the PZT. Cylindrical PZTs elongate along this longitudinal axis.

FIG. 6B is a radial cross-section of holder 80 illustrating a preferred shaped passageway (81) with ferrule 25 in place. In general passageways are shaped to include three-substantially flat regions so that the ferrule can be secured therein at three points of contact around the circumference of the ferrule. The illustrated passageway is substantially cylindrical having relatively short flats (82A, 82B and 82C) for contacting the ferrule. This design is preferred for stability of alignment. The flats of width (a) are preferably equiangularly and symmetrical arrayed around the passageway. The angle a (90) is preferably about 120°. The diameter of the passageway, $d_p$, is slightly larger than that of the ferrule, $d_f$ so that the ferrule can be inserted into the passageway without binding. Preferably the width a is selected such that $$a \geq 2\sqrt{d_p^2 - d_f^2}$$

The ferrule retention means shown in FIG. 6B is a resilient arm 87 is formed by extending a slot 89 outward from the holder passageway 81 under the bottom of the tapped holes. Flat contact 82A is on the inner side (toward the passageway) of this resilient arm. For convenience of machining the body, slot 89 which creates arm 87 can extend the entire longitudinal length of the holder body. Alternatively, a resilient arm can be positioned between the bottom of each screw hole along the length of the passageway. Three-point contact between the ferrule and the passageway along the length of the ferrule is secured by tightening a screw, preferably a cupped screw, into a tapped hole 83. The end of the screw contacts the outer side of the resilient arm 87, displacing it downwardly to contact the ferrule in the passageway. As a result of the downward force applied through the screw the ferrule also contacts the passageway at 82B and 82C. The axis of passageway 81 (9) is optionally displaced from the axis of the holder body (91) to provide additional room for tapped holes.

U.S. Pat. No. 5,422,970 and U.S. Pat. No. 5,509,093, describe means for temperature compensation of ferrule alignment fixtures like those of FIG. 6A including selection of materials for the fabrication of ferrule holders. The temperature compensated alignment fixtures of these patent references can be employed in the construction of FFPL of this invention.

It will be appreciated by those of ordinary skill in the art that many variations of shaped passageways can be employed to achieve the desired three-point contact with the ferrule. It will also be readily apparent that the passageways can be shaped such that an inserted ferrule will make more than three contacts at flats therein. Such multi-point contact schemes which incorporate a basic three-point contact scheme are within the scope of the present invention, but are not preferred.

Holder 80 can have alternate ferrule retention means, for example a separate element or channel retained in position intermediate between the bottom of the tapped holes 30 and the ferrule in the passageway. The various ferrule retention means described in U.S. Pat. No. 5,422,970 can be employed in the FFP lasers of this invention.

Ferrules are aligned within the fixture of FIG. 6A by the iterative rotary alignment technique described in U.S. Pat. No. 4,545,644. It has been found empirically that PZT-tuned FFPs of FIG. 6A that there is no need to incorporate such a fixture offset to increase the offset between fiber axes in the FFP. Typically, there is sufficient fiber axis offset resulting from ferrule mismatch, variations in individually machined parts and variations resulting from bonding the holders to the PZT to allow the rotary alignment technique to be use. In the rare event that the fiber axes offset is not sufficient in an FFP, simply substituting one of the ferrules for another will generate the required offset.

Ferrule holders 80 can be fabricated from any material that will provide a durable rigid support for the ferrules. Various metals, such as stainless steel, can be employed. In general, passageway 81 are shaped by any high precision machining techniques appropriate for the material chosen. Low-expansion alloys can be difficult to machine, however, electron discharge machining techniques as are well-known in the art can be employed to introduce the desired shaped passageways, channels and slots in the inventive holders.

As discussed above, for many applications FFP lasers must be temperature compensated to minimize the undesired effect of ambient temperature changes on cavity length. In addition, temperature compensation minimizes the effect of ambient temperature changes on insertional loss, due to variation of alignment of fibers with temperature. Detriment to alignment is minimized in FFPs if the force on the ferrule within the holder remains substantially constant as a function of temperature.

In the PZT-tuned FFP lasers of FIG. 6A temperature compensation is achieved in part by the use of controlled thickness of positive thermal coefficient adhesive in the bonds between the holders and the PZT, as described above. Losses due to fiber misalignment with temperature is minimized by choice of materials for the holder and its component parts. Ferrule holders are most preferably entirely fabricated from a material which has a thermal expansion coefficient equal to that of the material from the ferrules are constructed. Since ferrules are typically made from low-expansion glass like, Pyrex™ and quartz, low-expansion metal alloys, i.e. those having a thermal expansion coefficient of about 7.5 ppm/° C. or less are preferred materials for preparation of ferrule holders. Particularly suitable low-expansion alloys are those containing nickel and iron, such as Invar™, ternary alloys of nickel, iron and cobalt, such as Kovar™, or ternary alloys of iron, cobalt and chromium, such as Elinvar™, all as described in M. A. Hunter (1961) Metals Handbook, American Society of Metals 8th Ed. (Taylor Lyman, ed.) Volume 1, p.816–819.

For example, a low-expansion alloy having a thermal expansion coefficient of about 3.6 ppm/° C. (the thermal expansion coefficient of Pyrex™) would be most preferred for use with Pyrex™ ferrules. This is true, however, only if the entire holder including the screws can be fabricated from such a low-expansion alloy. These alloys are, however, difficult to machine. It is therefore difficult and expensive to prepare screws from many low-expansion alloys. Further, while it is possible to make an alloy with a desired low thermal expansion coefficient by variation of its component elements as described in Hunter (1961), supra, it is more efficient and less expensive to employ commercially available alloys, like Kovar™ or Invar™.

Excellent temperature compensation of a PZT-tuned FFP laser of FIG. 6A using Pyrex™ ferrules can be obtained when the holder is made of Kovar™ and low-expansion stainless screws are used. The mismatch between the thermal expansion coefficient of Kovar™ (about 5 ppm/° C.) and Pyrex™ (3.6 ppm/° C.) was compensated by use of screws of higher thermal coefficient material (stainless steel of about 10 ppm/° C.). If an alloy of slightly lower expansion coefficient were employed for a holder for Pyrex™ ferrules, the desired balance would be obtained by using screws having a slightly lower expansion coefficient than stainless steel.

Such general principles can be used to select appropriate materials for ferrule holders and components to achieve temperature compensation. The temperature compensation achieved by any particular selection of materials for holders and screws can be readily tested as described in U.S. Pat. No. 5,422,970 Methods described therein and in pending U.S. Pat. No. 5,509,093 (which is incorporated by reference in its entirety herein) for temperature compensation of fixtures like that in FIG. 6A are applicable to the FFP lasers of this invention.

In general, satisfactory temperature compensation of an FFP of FIG. 6A can be achieved if the ferrule holder body is fabricated of material having a thermal expansion coefficient within a factor of two higher or lower than that of the ferrule material. Over this range choices of materials for the ferrule retention element and or screws can be made to satisfactorily compensate for mismatches in thermal expansion coefficients of the body and the ferrules. Preferred ferrule materials for temperature compensated FFPs are those which have a thermal expansion coefficient that differs from that of the ferrule material by less than about 50%, e.g. for Pyrex™ ferrule holders made of materials having a thermal expansion coefficient between about 5.4 and 1.8 ppm/° C. are preferred.

Ferrule holders of the fixture of FIG. 6A can be adapted to provide an adjustable means for selectively changing the longitudinal thermal expansion coefficient of the filter as described for the holder of FIGS. 4C and 5B, above. In ferrule holder 80 when the holder body is made of a material having a thermal expansion coefficient different from that of the ferrules, the ferrule retention element is made of a different material selected to compensate for the mismatch. Since the ferrule retention element extends the entire length of the ferrule under the plurality of adjustable screws, temperature compensation is adjustable by changing the points of contact with the holder body along the length of the ferrule.

The FFPs of this invention can employ any type of piezoelectric transducer means which transforms electrical energy into mechanical energy by utilizing the piezoelectric longitudinal effect. PZTs employed are preferably stacked PZTs. PZTs elongate on application of an electric field and the elongation is proportional to the applied field. In a stacked PZT about 10 mm long, as those exemplified herein, application of about 50 V to the PZT results in an elongation of about 2–3 $\mu$m. Electrostrictive materials which elongate on application of a field, but in which the elongation is proportional to the square of the applied field can also be employed in the FFPs of this invention to vary cavity length. Like PZTs, electrostrictive materials will display negative temperature coefficients, the effect of which can be compensated as described herein specifically for PZTs.

The FFPs herein can combine any means of passive temperature compensation with the means for adjustment of the temperature coefficient that is disclosed herein. The methods for passive temperature compensation described herein can be employed alone or in combination with the methods for adjustment of temperature drift described herein. Similarly, the methods and ferrule holders described herein for temperature coefficient adjustment in an FFP laser can be employed in the absence of passive temperature compensation, such as the use of aluminum blocks and/or controlled epoxy layers. It is most preferred in order to minimize drift and maximize production yield, to combine passive means and adjustable means described herein. The temperature compensated FFP lasers of this invention can be employed in combination with wavelocking circuity as is know in the art.

The ferrule alignment fixtures of FIGS. 5A and 6A can be miniaturized to have dimensions less than about 6.8 mm high, 10 mm wide and 30 mm long. Miniaturized FFP devices are useful in any application in which space is at a premium, and particularly useful for mounting on circuit boards.

As will be appreciated by those in the art, intensity losses in the fiber ferrule assemblies herein can be due to a number of factors including diffraction and absorption at the mirrors as well as to misalignment of the fibers. It will also be appreciated that obtaining a low-loss filter requires minimization of all such losses. Means for minimizing losses which are not the result of fiber misalignment within a resonance cavity are well-known in the art.

The FFP lasers exemplified herein all employ a single-pass pump scheme. Pump efficiency can be enhanced in these lasers by use of double-pass or pump resonance cavity pump schemes. Operation and implementation of such conventional pumping schemes are generally well-known in the art. Ferrule assemblies are particularly well suited for use with double-pass and resonance cavity pump configurations because the additional mirrors required for the pump configuration can be readily incorporated into ferrule assemblies using ferrule wafer bonding, grinding and polishing techniques. The pump source is chosen in view of the active fiber to provide $\lambda_p$ that will be absorbed in the active fiber to ultimately induce lasing. It will be appreciated that any particular lasing material may absorb at several different wavelengths. In such a case, different pump sources may be useful and the choice of a particular pump source will depend upon a number of factors including the strength of the absorption and the availability of stable lasers which emit $\lambda_p$. For example, Er-doped fibers can be pumped at 1490 nm or more preferably at 980 nm.

In the multiple cavity lasers of this invention, substantial pump power may remains unabsorbed on passage through the active fiber of the laser cavity. Residual pump power can be used to pump an optical amplifier optically coupled to the laser to amplify its output. For example, an Er-doped fiber amplifier in a fiber master oscillator power amplifier (MOPA) configuration can be employed as described in Ball, G. A. and W. W. Morey (1992), Digest of Conference on Optical Fiber Communications, Optical Society of America, Washington, D.C. p. 97. Power output of the FFP lasers of this invention can be significantly enhanced by use of fiber optic amplifiers. The theory and operation of fiber optic amplifiers is well-known in the art. Those of ordinary skill in the art can generally make appropriate selections of types and configurations of amplifiers that can be used in combination with the FFP lasers of this invention.

The FFP lasers of this invention are useful as light sources in a variety of communication, sensor and spectroscopy applications. Single-frequency and single-mode FFP lasers with $\lambda_s$ in the range of 1.55 nm are particularly useful in telecommunications applications. Broad-bandwidth tunable single-frequency and single-mode FFP lasers are particularly attractive for multi-channel telecommunications applications. The fiber laser cavities of this invention are particularly well suited to broad-bandwidth tuning applications.

As will be appreciated by those of ordinary skill in the art, the FFP laser cavities of this invention can be modified and/or adapted to optimize performance for particular applications. Cavity designs can be modified by mode-filed matching of separate fiber segments, inclusion of a second (or higher) active cavity and mirrors can be tailored in bandwidth for lasing at different portions of the $Er^{3+}$ (or other ion) spectrum.

FFP lasers which emit two orthogonal polarization modes are attractive for polarization sensor applications as described in G. A. Ball et al. (1993) Optics Letts 18(22):1976–1978. Polarization sensors can be used to measure temperature, strain, and pressure changes and any other environmental factor that effects birefringence in the active fiber. Because the active fibers of the FFP lasers of this invention are held within ferrules, they will generally be most applicable to temperature sensors. In order to adapt a FFP laser to a particular sensing application it may be necessary to modify the birefringence of the active fiber. It is well-known in the art that fiber birefringence can be modified by addition of certain dopants, such as germanium or aluminum.

FFP lasers which emit two orthogonal polarization modes can be converted to a single-polarization mode laser by use of D-shaped fiber in which the flat portion of the fiber is coated with metal. It is well-known in the art that such fibers absorb one polarization mode and the operation and implementation of D-shaped fibers is understood in the art.

As examples of fiber optic lasers of this invention, three-mirror FFP lasers (Examples 1–4, Table 1) were constructed having a multiple-wafered ferrule assembly with fiber gap of FIG. 2a supported and aligned in a low-loss, temperature compensated FFP alignment fixture of design shown in FIGS. 6A and 6B. Laser cavity length can be tuned by changing the fiber gap by application of a voltage to the PZTs of the alignment fixture. Both the embedded mirror of the wafered ferrule and the end mirror of the mirror-ended ferrule were $TiO_2/SiO_2$ dielectric mirrors directly deposited, as discussed above, on the polished ends of the ferrules. A diode laser with center wavelength of about 982 nm (Spectra Diode Laboratories Model SDL-6321-Gi laser) was used to pump the system. The pump laser had a maximum available output power Pp of about 85 mW, under the conditions used ($I_p$=200 mA). The active fiber lazes at about 1550 nm. Pump radiation was passed through an isolator and at 980/1550 WDM to prevent feedback into the pump. Laser output was passed through an output isolator and monitored employing several FFP scanning interferometers with resolution ranging from 14.1 GHz to 30 kHz.

Er:Yb codoped phospho-silica glass fiber was used in the exemplified lasers. Fiber (a) had $Er^{3+}:Yb^{3+}$ doping of 1,000:12,800 ppm, cutoff wavelength near 1120 nm and an effective emission cross-section $\sigma_e$ of about $5.68 \times 10^{-25}$ $m^2$. Fiber (b) had a $\sigma_e$ 1.2 times larger than fiber (a). Assuming no intra-cavity loss, the minimum cavity length for laser action in fiber (a) with 99.9% mirrors is calculated as about 80 μm. Assuming a realistic passive-cavity single transit loss of 0.0006, the minimum cavity length for laser action in fiber (a) with 99.9% mirrors is calculated as about 128 μm.

In the exemplified lasers, discrete wavelength tuning operation is achieved employing an active fiber cavity $l_1$ and a shorter tunable passive cavity $l_2$. The use of a longer active cavity $l_1$ (compared to the passive cavity, $l_2$) facilitates higher pump absorption, wider above-threshold gain-bandwidth and higher output power. The spectral characteristics of the three mirror system have a discrete wavelength spacing corresponding to the free spectral range of cavity $l_1$ $FSR_1$ and a total tuning range limited by $FSR_2$ of the shorter $l_2$ passive cavity.

Table 1 lists cavity lengths and mirror reflectivities of example lasers 1–4 and their corresponding tuning ranges.

$R_1$, $R_2$ and $R_3$, in Table 1 correspond to the reflectivity of mirrors, 26, 28 and 18, respectively, in FIG. 2. The use of a central mirror in the three-mirror configuration of lower reflectivity than that of the end mirrors ($R_2 > R_1$ or $R_3$) is preferred for stronger coupling between the two cavities ($l_1$ and $l_2$ cavities).

TABLE 1

COMPOUND CAVITY FPP LASER PERFORMANCE

| fiber[1] | R1(%) | $l_1$(mm) | R2(%) | $l_2(\mu m)^2$ | m R3(%) | Dλ(nm) |
|---|---|---|---|---|---|---|
| 1 | a | 99.9 | 1.0 | 97.5 | 80 | 99 | 4.81 |
| 2 | a | 99.9 | 2.0 | 92 | 126 | 92 | 5.6 |
| 3 | b | 99.99 | 2.0 | 92 | 108 | 92 | 7.55 |
| 4 | b | 99.99 | 2.0 | 92 | 65.5 | 98.6 | 9.59 |

[1]P-Si fiber as described in test; (a) has $\sigma_e = 5.68 \times 10^{-25}$ $m^2$ and (b) has $\sigma_e$ 1.2 timers higher than (a).
[2]$l_2$ assumes air-gap, i.e. fiber gap, = 0.0 mm, air-gap increases by about 1–2 μm upon tuning.

Figure 7A:
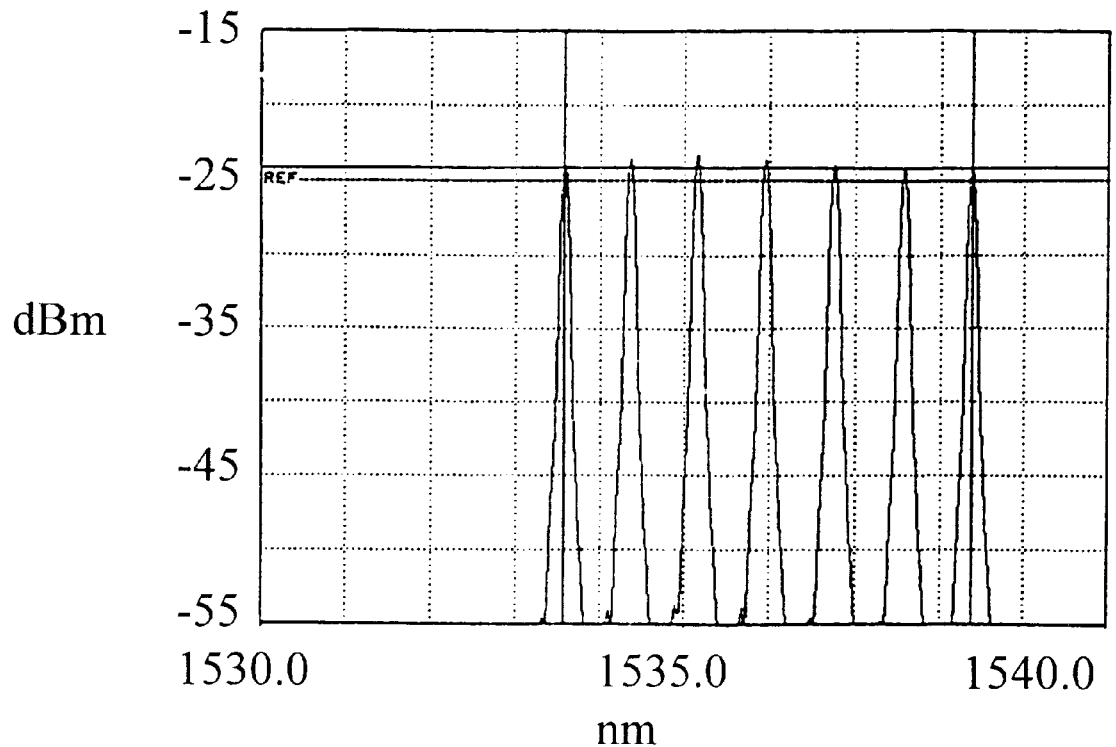
FIGS. 7a–c show the discrete wavlength tuning ranges (D) of compound cavity lasers of Table 1.
Figure 7B:
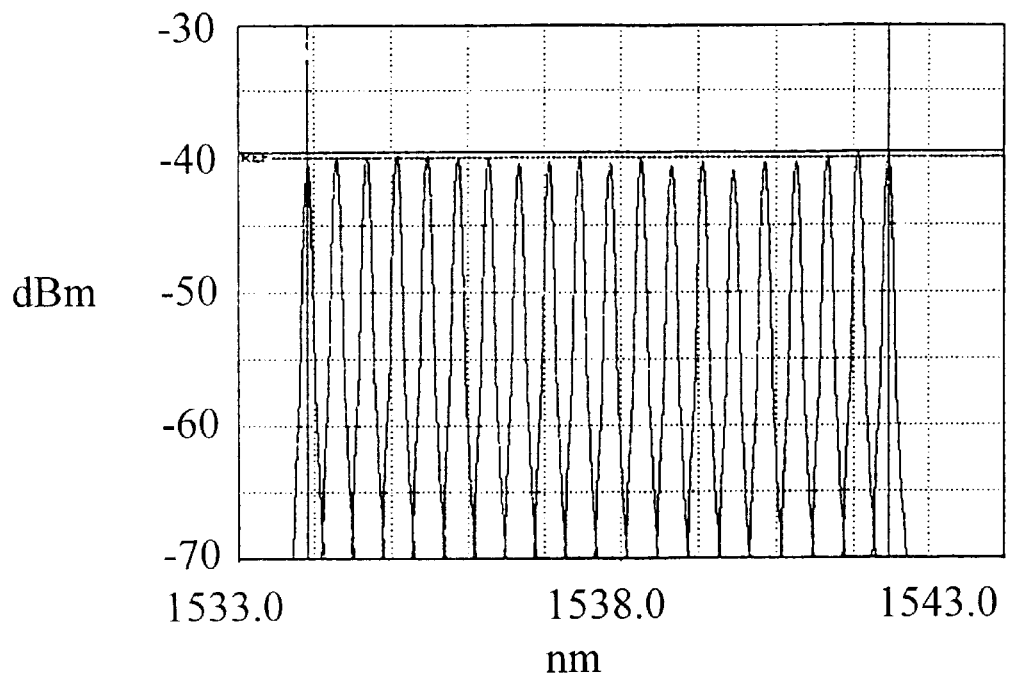
Figure 7C:
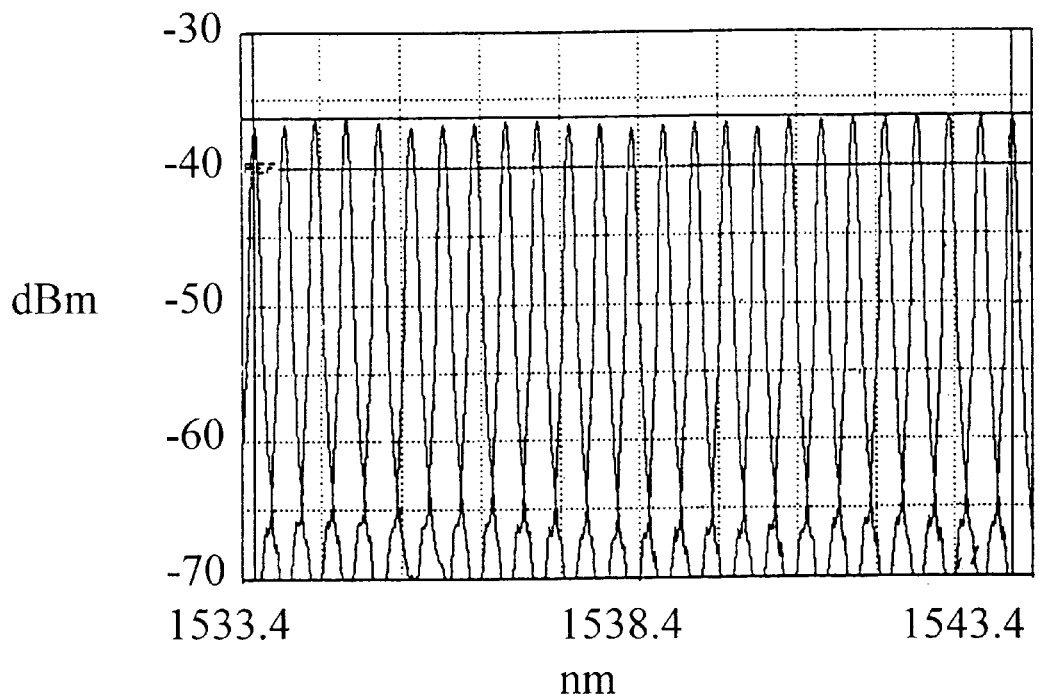

FIGS. 7a, b and c show discrete wavelength tuning ranges for compound cavity lasers 1, 3 and 4 of Table 1. Laser 1 demonstrates (FIG. 7a) tuning of 7 discrete wavelengths over a 4.81 nm span, where the 0.8 nm wavelength spacing corresponds to $FSR_1$. The tuning range in this case is 47% of $FSR_2$ since there is apparently insufficient gain-bandwidth to overcome cavity loss. The 2 mm gain cavity laser 2 is clearly improved over laser a in tuning range that reaches about 86% of $FSR_2$ see Table 1. The use of a higher gain fiber in lasers 3 and 4, extends the tuning ranges to 7.55 nm and 9.59 nm, as shown in FIGS. 7b and c, respectively, which correspond to about 100% and 77% of their respective $FSR_2$'s. Direct spectral observation by high-resolution FFP scanning interferometers (not shown) revealed that both lasers 3 and 4 exhibit single-polarization operation throughout all tuning ranges and pump power levels.

Figure 8:
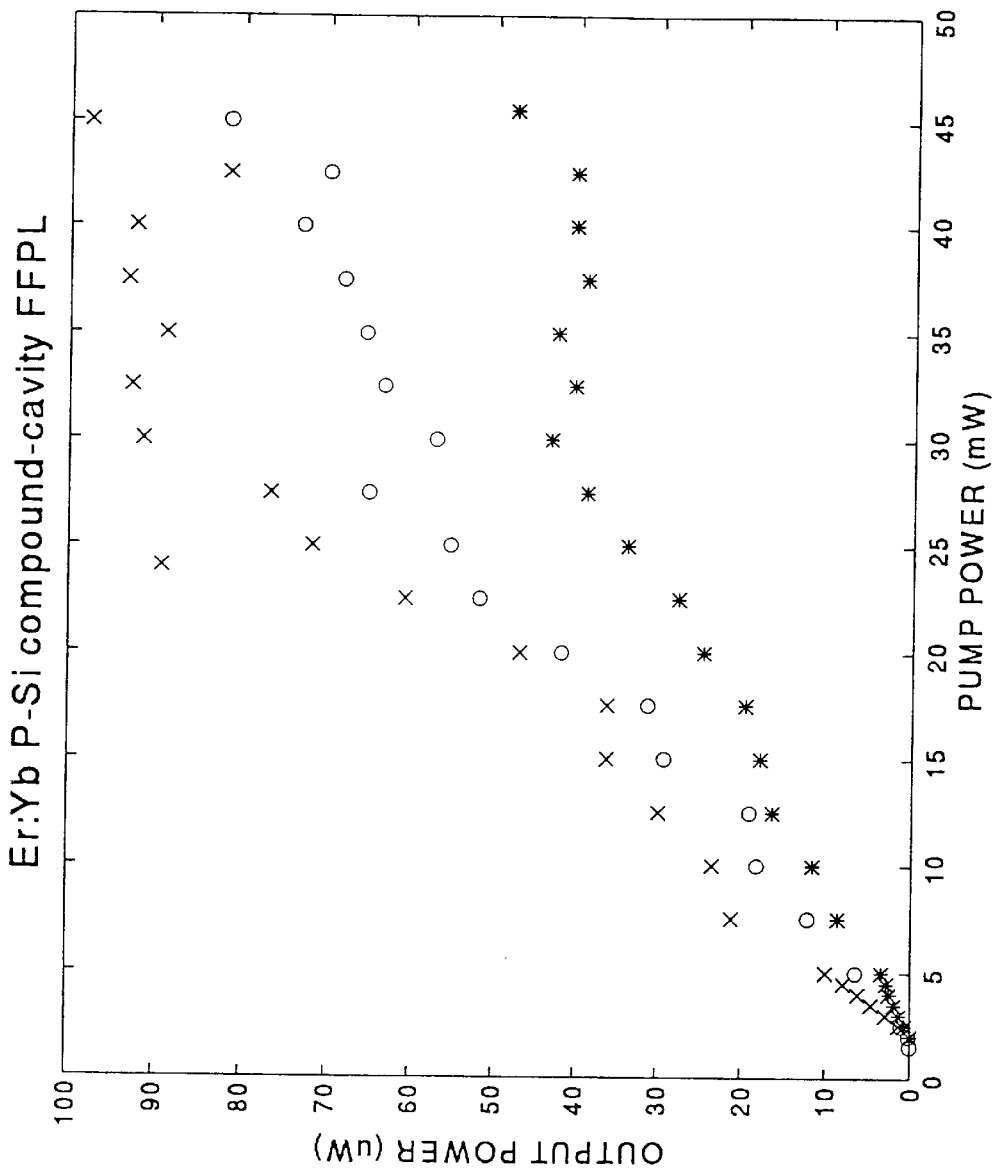
FIG. 8 is a plot of laser power as a function of pump power of the compound-cavity $Er^{3+}:Yb^{3+}$ P-SI FFP lasers of Table 1 where open circles are for laser 2, crosses for laser 3 and "*" for laser 4.

FIG. 8 is a plot of laser output as a function of pump power for lasers 2, 3 and 4 of Table 1. A higher slope efficiency of about 0.3% was observed in laser 3 compared to that of 0.15% observed in laser 4 because of the lower $R_3$ used in laser 3. The higher $R_3$ was needed in laser 4 to obtain higher second-cavity finesse to enforce single-frequency lasing due to its wider $FSR_2$.

Those of ordinary skill in the art to which this invention pertains will appreciate that the configurations, materials and techniques specifically described in the specification and figures herein can be modified, altered or adapted while achieving the objectives of this invention. All such alterations, modifications and adaptations that embody the principles of this invention are encompassed within the spirit and scope of this invention.

We claim:

1. A multiple-cavity fiber optic laser comprising two or more resonance cavities aligned in a fiber ferrule assembly wherein at least one of the cavities is a laser gain cavity and wherein the laser gain cavity is greater than 1 millimeter in length.

2. The fiber optic laser of claim 1 wherein the laser gain cavity is about 1 to about 10 millimeters in length.

3. The fiber optic laser of claim 1 wherein at least one of the resonance cavities is tunable.

4. The fiber optic laser of claim 1, further comprising a piezoelectric transducer constructed and arranged to modify the length of one of the resonance cavities.

5. The fiber optic laser of claim 1 wherein the ferrule assembly comprises a wafered ferrule.

6. The fiber optic laser of claim 1 wherein the lengths of the two cavities are selected to obtain single-mode lasing.

7. A multiple-cavity fiber optic laser having a laser gain cavity formed in a fiber ferrule assembly wherein the laser gain cavity is greater than 1 millimeter in length which comprises:

a fiber ferrule assembly containing a first and a second ferrule each having an internal and an external end, each ferrule having a substantially axial bore therethrough for receiving optical fiber, each ferrule having optical fiber in its axial bore, each ferrule having at least one mirror transverse to the optical fiber in the axial bore with one of said first or second ferrules having at least two mirrors transverse to the optical fiber, and each ferrule having an optical fiber end at its internal end and optical fiber extending from its external end, said ferrules positioned with respect to each other such that the internal ends are opposed and optionally spaced apart, and said laser gain cavity formed between opposing reflective surfaces of two of the mirrors in said ferrule assembly with the optical fibers of the opposing ferrules aligned to allow optical transmission through the optical fibers of the ferrule assembly wherein the optical fiber throughout said ferrule assembly is single transverse mode optical fiber and the optical fiber in said laser gain cavity comprises an active optical fiber and a pump laser means for pumping energy into said fiber laser gain cavity such that the energy can be absorbed by the lasing material in the active optical fiber to induce sufficient population inversion therein to generate lasing of the active optical fiber.

8. The fiber optic laser of claim 7 wherein the active optical fiber is a rare-earth ion doped glass fiber.

9. The fiber optic laser of claim 7 wherein the active optical fiber is an Er:Yb codoped glass fiber.

10. The fiber optic laser of claim 7 wherein each cavity of the multiple-cavity ferrule assembly is less than or equal to about 10 millimeters in length.

11. The fiber optic laser of claim 7 in which the ferrule assembly has three mirrors.

12. The fiber optic laser of claim 7 further comprising a means for changing the length of the laser gain cavity to thereby tune the wavelength emitted by the laser.

13. The fiber optic laser of claim 7 further comprising a support means for holding the first and second ferrules such that the fibers in the opposing ferrules are aligned and wherein the support means comprises a means for adjusting the relative alignment of the ferrules.

14. The fiber optic laser of claim 7 wherein the ferrules are spaced apart to form a fiber gap between two of the mirrors of the ferrule assembly and which further comprises a support means for holding the ferrules in alignment which support means comprises a means for adjusting the alignment of the ferrules in the support means and a means for electromechanically tuning the wavelength emitted by the laser by changing the length of the fiber gap without substantial loss of fiber alignment.

15. The fiber optic laser of claim 14 wherein said support means further comprises adjustable means for selectively changing the temperature coefficient of said laser.

16. The fiber optic laser of claim 7 further comprising an optical amplifier optically coupled to said laser gain cavity and said means for pumping said laser gain cavity such that residual pump energy is absorbed in said amplifier resulting in amplification of the output of said laser.

17. The multiple-cavity fiber optic laser of claim 7 wherein the laser gain cavity is less than or equal to about 10 millimeters in length.

18. The multiple-cavity fiber optic laser of claim 17 wherein the active optical fiber in the laser gain cavity is a rare-earth ion doped glass fiber.

19. The multiple-cavity fiber optic laser of claim 18 wherein the active optical fiber is an Er:Yb codoped glass fiber.

20. A multiple-cavity fiber ferrule assembly comprising a first and a second ferrule each having an internal and an external end, each ferrule having a substantially axial bore therethrough for receiving optical fiber, each ferrule having optical fiber in its axial bore, each ferrule having at least one mirror transverse to the optical fiber in the axial bore, at least one of said ferrules having a second mirror transverse to its optical fiber, and each ferrule having an optical fiber end at its internal end and an optical fiber extending from its external end, said ferrules positioned with respect to each other such that the internal ends are opposed and optionally spaced apart, and said laser gain cavity formed between opposing reflective surfaces of two of the mirrors in said ferrule assembly with the optical fibers of the opposing ferrules aligned to allow optical transmission through the optical fibers of the ferrule assembly;

wherein the optical fiber throughout said ferrule assembly is single transverse mode optical fiber, the optical fiber in said laser gain cavity comprises an active optical fiber and the laser gain cavity formed in said ferrule assembly is greater than 1 millimeter in length.

21. A fiber ferrule assembly of claim 20 wherein in said ferrule assembly said first ferrule is a multiple-wafered ferrule with two embedded mirrors and said second ferrule is a mirror-ended ferrule.

22. The fiber ferrule assembly of claim 20 wherein each cavity in the assembly is less than or equal to about 10 millimeters in length.

23. The fiber ferrule assembly of claim 20 wherein the opposed internal ends of said ferrules are spaced apart to form a fiber gap within the laser gain cavity.

24. A multiple-wafered ferrule having an FFP cavity comprising:

a ferrule and a first and second wafer, each of said wafers and said ferrule having a substantially axial bore therethrough for receiving optical fiber, each of said wafers and said ferrule having optical fiber in its axial bore, each of said wafers having an internal end and an external end with an optical fiber end at each of said internal and external ends, said ferrule having an internal and an external end with an optical fiber end at said internal end and optical fiber extending from said external end, wherein said first wafer is aligned with and bonded at its internal end to the internal end of said ferule to form a wafered ferrule in which the optical fibers of said ferrule and said first wafer are aligned and wherein the second wafer is aligned and bonded to the external end of said first wafer of said wafered ferrule such that the optical fibers of said second and first wafers and said ferrule are aligned, and two embedded mirrors traversing the optical fiber of said multiple-wafered ferrule between said first wafer and said second wafer and between said first wafer and said ferrule forming said FFP cavity in said multiple-wafered ferrule, wherein said FFP is greater than 1 millimeter in length and the fiber in the resonance cavity of said multiple-wafered ferrule is active fiber.

25. The multiple-wafered ferrule of claim 24 wherein the fiber between the two embedded mirrors is active fiber.

26. The multiple-wafered ferrule of claim 24 wherein the active fiber is an Er:Yb codoped glass fiber.

27. The multiple-wafered ferrule of claim 26 wherein the active fiber is Er: Yb codoped phospho-silicate fiber.

28. The multiple-wafered ferrule of claim 27 wherein the active fiber is Er: Yb codoped phosphate-glass fiber.

* * * * *

UNITED STATES PATENT AND TRADEMARK OFFICE
CERTIFICATE OF CORRECTION

PATENT NO. : 6,137,812
DATED : October 24, 2000
INVENTOR(S) : Hsu et al.

It is certified that error appears in the above-identified patent and that said Letters Patent is hereby corrected as shown below:

Column 1,
Line 49, please replace "Kringlebotn" with -- (Kringlebotn) --.

Column 3,
Line 45, please replace "mirror coatings" with -- mirror coatings, --.

Column 5,
Line 44, please replace mirrors 24" with -- mirrors 26 --.
Line 50, please replace "mirrors 24" with -- mirrors 26 --.

Column 7,
Line 67, please replace "hohnium" with -- holmium --.

Column 8,
Line 2, please replace "1.5 nm" with -- 1.5 µm --.

Column 10,
Line 48, after "regions (49" please delete "and 49'".

Column 12,
Line 54, please replace "body 79" with -- body 89 --.

Column 14,
Line 3, please replace "that PZT-tuned" with -- that in PZT-tuned --.
Line 4, please replace "FIG. 6A that" with -- FIG. 6A --.

UNITED STATES PATENT AND TRADEMARK OFFICE
CERTIFICATE OF CORRECTION

PATENT NO. : 6,137,812
DATED : October 24, 2000
INVENTOR(S) : Hsu et al.

Page 2 of 2

It is certified that error appears in the above-identified patent and that said Letters Patent is hereby corrected as shown below:

Column 16,
Line 44, please replace "remains" with -- remain --.
Line 62, please replace "1.55 nm" with -- 1.55 µm --.

Column 17,
Line 58, please replace "fiber cavity $l_1$ with -- fiber cavity $l_1$ (30 in FIG. 2a) --.
Line 59, please replace "passive cavity $l_2$" with -- passive cavity $l_2$ (32 in FIG. 2a) --.
Line 68, please replace "tuning ranges." with -- tuning ranges (D1(nm)). --.

Column 18,
Line 11, in Table 1, please replace "D$\lambda$ (nm)" with -- $\Delta\lambda$ (nm) --.

Column 19, claim 7,
Line 24, please replace "the lasing material" with -- a lasing material --.

Column 20, claim 20,
Line 12, please replace "said laser gain cavity" with -- a laser gain cavity --.

Column 20, claim 21,
Line 22, please replace "A fiber ferrule assembly" with -- The fiber ferrule assembly --

Column 20, claim 24,
Line 57, please replace "the resonance cavity" with -- the FFP cavity --

Signed and Sealed this

Thirtieth Day of October, 2001

Attest:

*Nicholas P. Godici*

NICHOLAS P. GODICI
*Acting Director of the United States Patent and Trademark Office*

*Attesting Officer*